(12) United States Patent
Canavor et al.

(10) Patent No.: US 10,606,449 B2
(45) Date of Patent: Mar. 31, 2020

(54) ADJUSTING AUDIO OR GRAPHICAL RESOLUTIONS FOR DATA DISCOVERY

(71) Applicant: Amazon Technologies, Inc., Seattle, WA (US)

(72) Inventors: Darren Ernest Canavor, Redmond, WA (US); Moustafa Ghazal, Bothell, WA (US); Darryl Havens, Seattle, WA (US); Jane Mooney, Seattle, WA (US); Luan Khai Nguyen, Seattle, WA (US); Brandon William Porter, Yarrow Point, WA (US)

(73) Assignee: Amazon Technologies, Inc., Seattle, WA (US)

( * ) Notice: Subject to any disclaimer, the term of this patent is extended or adjusted under 35 U.S.C. 154(b) by 337 days.

(21) Appl. No.: 15/474,939

(22) Filed: Mar. 30, 2017

(65) Prior Publication Data
US 2018/0284955 A1 Oct. 4, 2018

(51) Int. Cl.
*G06F 3/048* (2013.01)
*G06F 3/0482* (2013.01)
(Continued)

(52) U.S. Cl.
CPC ............ *G06F 3/0482* (2013.01); *G06F 3/167* (2013.01); *G06F 16/29* (2019.01); *G06F 16/632* (2019.01);
(Continued)

(58) Field of Classification Search
CPC ................. G06F 3/0482; G06F 16/632; G06F 17/30241; G06F 17/30755; G06F 3/167;
(Continued)

(56) References Cited

U.S. PATENT DOCUMENTS 7,788,134 B1 *  8/2010  Manber ................. G06Q 30/06
                                                           705/26.1
8,229,942 B1     7/2012  Hubinette
(Continued)

OTHER PUBLICATIONS

U.S. Appl. No. 15/474,997, filed Mar. 30, 2017, Titled: Data Discovery Through Visual Interactions.
(Continued)

*Primary Examiner* — Pei Yong Weng
(74) *Attorney, Agent, or Firm* — Kilpatrick Townsend & Stockton LLP

(57) ABSTRACT

Techniques for managing and discovering data using visual or audible representations may be provided. The data, in some examples, may correspond with individual items, and the system may correlate each item with a representation of the item (e.g., for navigation, for accessibility, etc.). The representations may be provided to allow discovery of the items in response to adjusting the resolution, audibly requesting information, or panning across a display to discover items that are displayed as these representations outside of the original presentation of representations. In some examples, the representation of the item may not be unique to the item or may be represented as a placeholder image or description. The higher the resolution, the more detail about the item may be provided. When an item is selected, item data may be provided that corresponds with the item.

19 Claims, 12 Drawing Sheets

(51) Int. Cl.
*G06F 3/16* (2006.01)
*G06Q 30/06* (2012.01)
*G06F 16/632* (2019.01)
*G06F 16/29* (2019.01)
*G06F 3/0481* (2013.01)
*G06T 19/00* (2011.01)

(52) U.S. Cl.
CPC ..... *G06Q 30/0635* (2013.01); *G06F 3/04815* (2013.01); *G06F 2203/04806* (2013.01); *G06T 19/006* (2013.01); *G06T 2210/36* (2013.01)

(58) Field of Classification Search
CPC ....... G06F 2203/04806; G06F 3/04815; G06F 2206/1008; G06Q 30/0635; G06T 19/006; G06T 2210/36
See application file for complete search history.

(56) References Cited

U.S. PATENT DOCUMENTS

| | | |
|---|---|---|
| 2005/0223339 A1 | 10/2005 | Lee |
| 2005/0268254 A1* | 12/2005 | Abramson ........... G01C 21/367 715/855 |
| 2007/0118520 A1* | 5/2007 | Bliss .................... G01C 21/367 |
| 2008/0238941 A1 | 10/2008 | Kinnan et al. |
| 2009/0048860 A1 | 2/2009 | Brotman et al. |
| 2012/0007866 A1 | 1/2012 | Tahan |
| 2012/0174023 A1 | 7/2012 | Kenemer et al. |
| 2012/0179552 A1* | 7/2012 | Tishkevich ............ G06Q 30/02 705/14.66 |
| 2012/0233003 A1 | 9/2012 | Calman et al. |
| 2012/0274625 A1* | 11/2012 | Lynch .................... G06T 17/05 345/419 |
| 2014/0108208 A1 | 4/2014 | Piana |
| 2014/0218394 A1 | 8/2014 | Hochmuth et al. |
| 2014/0306989 A1 | 10/2014 | Doubleday et al. |
| 2015/0205483 A1 | 7/2015 | Takamura et al. |
| 2015/0221014 A1 | 8/2015 | Gabbai et al. |
| 2015/0356654 A1 | 12/2015 | Katakawa |
| 2016/0093106 A1 | 3/2016 | Black |
| 2016/0104226 A1 | 4/2016 | Choi et al. |
| 2016/0343064 A1* | 11/2016 | Christopher ....... G06Q 30/0643 |
| 2017/0206708 A1 | 7/2017 | Gentilin et al. |
| 2017/0329488 A1 | 11/2017 | Welker et al. |
| 2018/0005440 A1 | 1/2018 | Mullins |
| 2018/0039479 A1 | 2/2018 | Fransen et al. |
| 2018/0124351 A1 | 5/2018 | Mattingly et al. |

OTHER PUBLICATIONS

PCT/US2018/025537, "International Search Report and Written Opinion", dated May 24, 2018, 11 pages.

* cited by examiner

ADJUSTING AUDIO OR GRAPHICAL RESOLUTIONS FOR DATA DISCOVERY

CROSS-REFERENCE TO RELATED APPLICATIONS

This application is related to U.S. patent application Ser. No. 15/474,997, filed on Mar. 30, 2017, entitled "Data Discovery Through Visual Interactions," the full disclosure of which is incorporated herein by reference for all purposes.

BACKGROUND

Systems are inundated with data that is expansive and difficult to manage. Some of these systems may be tasked with providing such information for users, but much of this information is not useful or may be irrelevant for users. For example, large amounts of data provided by the system are often difficult to decipher or analyze by users. Users also attempt to find particular information from large swaths of data, but the data are not provided in a manner that is easy to parse through. Users are left with little recourse, but to wade through large volumes of data without any help.

Additionally, some users may try to retrieve as much information as possible. Typically, retrieving information is performed by a one-by-one retrieval or all-out retrieval. One-by-one may be performed when the user requests something specific from a user device and the server provides the specific information to the user device. All-out retrieval may be performed when the server sends all or most of the information to the user device, and the user filters through the information.

Disadvantages correspond with both approaches of information retrieval. For example, with all-out retrieval, providing information that is irrelevant that requires filtering at the user device uses too much network bandwidth consumption and too much computing resource consumption. An advantage of the all-out retrieval includes allowing the user to access all information and can decide what is relevant. A disadvantage of the one-by-one retrieval method includes limiting access to what is requested. This method also does not allow discovery of other available information. However, the one-by-one retrieval method saves on bandwidth and computing resource consumption since less data are provided to the user.

BRIEF DESCRIPTION OF THE DRAWINGS

Various embodiments in accordance with the present disclosure will be described with reference to the drawings, in which.

DETAILED DESCRIPTION

Figure 1:
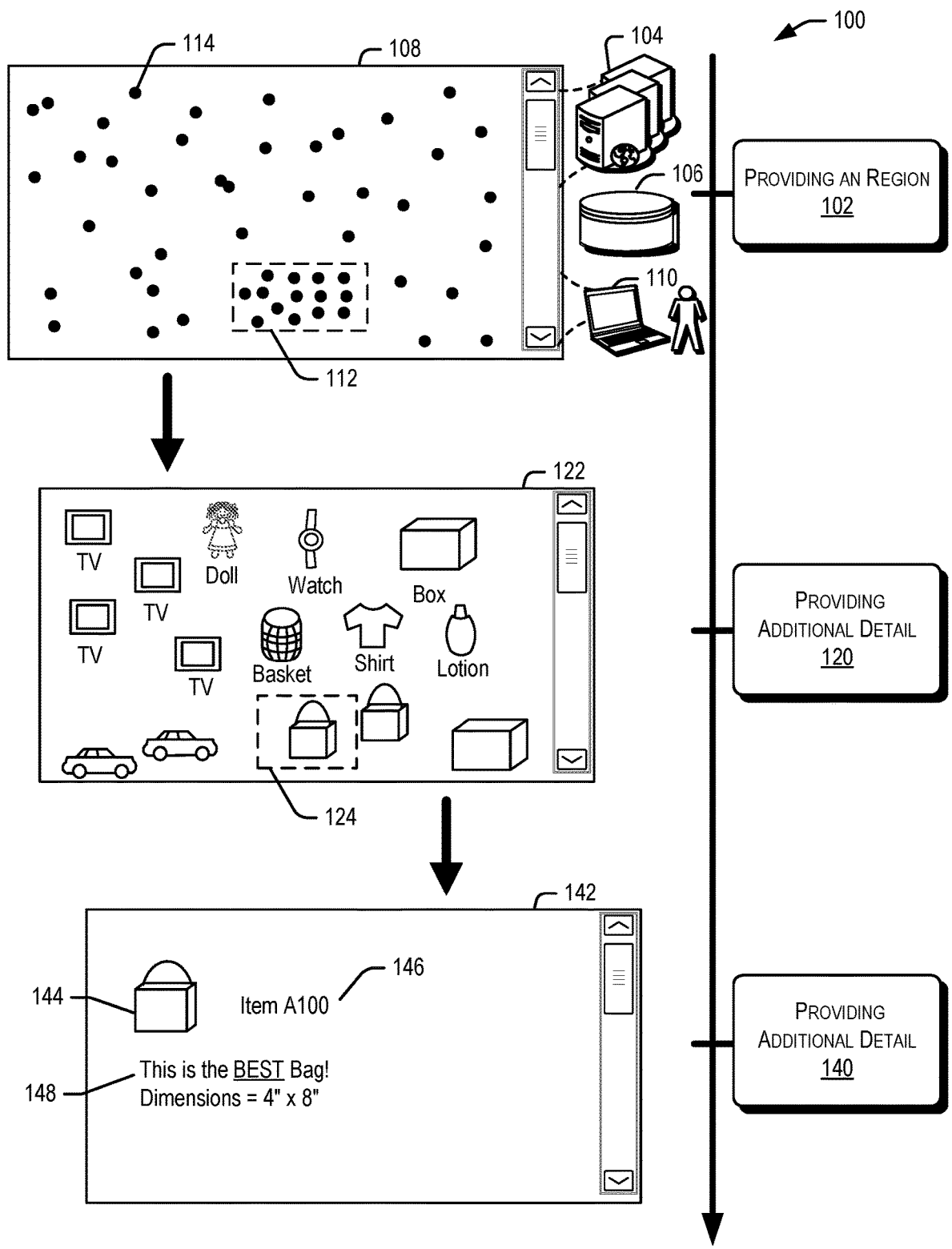
FIG. 1 illustrates an illustrative flow for managing data described herein, according to at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, a system for managing and discovering data using representations. In an example, the representations may be visual and/or audible. This system is provides benefits over both methods of retrieving information discussed in other applications (e.g., the one-by-one retrieval method and the all-out retrieval method, etc.). Particularly, the system provides access to all available information and also saves network bandwidth consumption through the system/client architecture described herein. Particularly, the data is available from a server (e.g., computing system, etc.) and may be sent to a client (e.g., user device, etc.) for discovery and presentation of the data.

The data, in some examples, may correspond with individual items, the system may correlate each item with a representation of the item (e.g., for navigation, for accessibility, visual or audible representations of the items, etc.). The representations may be provided to allow discovery of the items in response to adjusting the resolution, audibly requesting information, or panning across a display to discover items that are displayed as these representations outside of the original display of representations. In some examples, the representation of the item may not be unique to the item or may be represented as a placeholder image. The higher the resolution, the more detail about the item may be provided. When an item is selected, item data may be provided that corresponds with the item. When the representations are audible, the audible representations may be provided to allow discovery of the items in response to adjusting the resolution of the audible presentation of the items to allow for data discovery. The higher the resolution, the more detail about the item may be audibly provided.

In an illustrative example, a system may provide a network document that, when displayed at a user device, presents a two-dimensional white background with what appears to be black dots throughout the white background. Particularly, the white background may comprise thousands of low resolution graphical elements in no apparent order or grouping. Each graphical element represents a low resolution image corresponding with an item. The various items may be available for ordering from an electronic platform. The user can provide one or more requests to increase the resolution of the graphical elements (e.g., by scrolling, tapping on an "increase resolution" tool, panning, zooming, etc.). With each request to increase the resolution, the graphical elements may appear larger, provide a higher resolution, or may otherwise start to form images of items available from a storage facility. The images may be selectable by the user, such that when the user selects one of the images, a second network document (e.g., webpage, network page, etc.) is provided for the user in association with the selected item. The second network document may correspond with an item detail page that allows the user to order the item from an item provider. Other information may be provided with the second network document in various implementations of the disclosure.

In some examples, the system may provide the items using virtual reality through a virtual reality (VR) headset or other reality device (e.g., to provide augmented reality). For example, the representations of the items can be provided first at a low resolution level and then receive one or more interactions with the items by the user using a virtual reality device (e.g., clicking, tapping, swiping, blinking, etc.). In response to the interaction, the items can be provided at higher resolution levels and/or additional data may be presented, including a presentation of item detail that allows the user to order the item from an item provider. The items may be provided that are related to the environment where the VR headset is placed (e.g., items that should be placed in a living room when the user is in a living room, or items that are placed on an aisle of groceries in a grocery store, etc.).

In another illustrative example, a system may group, organize, or otherwise categorize the visual representations of items to direct the discovery of the items. For example, the system may provide a two- or three-dimensional image of a region (e.g., an interior of a library with electronic representations of books, a shopping mall with interactive representations of stores that provide various items, a geographic map that first displays the state of Washington, etc.). At a first resolution of the geographic map, for instance, the map may display state boundaries and large bodies of water. The user can request to increase the resolution of the map of Washington to zoom into the city of Seattle, Wash. At this resolution, the map may display city boundaries, highways, and bodies of water at various sizes (e.g., lakes, rivers, etc.). The user can submit additional requests to further increase the resolution of the map to an image of a street in the city of Seattle, Wash. (e.g., houses, garages, grocery stores, etc.), and then to further increase the resolution of the map to a living room on the street in the city of Seattle, Wash. The living room may comprise visual representations of items that may be stored in an actual living room while in use. The user may select various items in the image of the living room that appear to be integrated with the living room, including a television. The selection of the television may direct the user to an item detail page that allows the user to order the television from an item provider or storage facility. This method of displaying items in the context of their use may help the user discover items, rather than search for them, and prevent the user from searching through thousands of available items by reading individual descriptions or viewing individual images of the item.

In another illustrative example, a system may interact with a user audibly. For example, the user may request to receive an audible presentation of items (e.g., "what are some items for today?") or the system may proactively provide an audible presentation of items (e.g., "would you like to hear about some items today?"). The system can present a low resolution description of the items (e.g., items grouped by attribute including "there are ten electronic items deals today" or "here are the fifteen new items added today," etc.). The user may interact with the system by speaking or interacting with a user interface to provide a response. The items may be selectable by the user by speaking. When a request for additional detail is requested (e.g., audibly or visually, etc.), the system can present the item at a higher resolution and/or present the user with item detail that allows the user to order the item from an item provider (e.g., the higher resolution representation of the item may include "The first book deal is for the Acme Co. Book. The second book deal is for . . . ").

Different visual and audible combinations are possible as well. For example, the user may interact visually by tapping on a user interface and, in response to the interaction, receive an audible response that includes a summary of representations of items available for the day. The interactions may be audible or visual, and the representations of the items may be audible or visual. In another example, the user audibly asks for information and the system responds with visual representations.

Various benefits are realized in these systems and methods. For example, the server may store all the available information. At the high resolution, the user device may also receive all the information. However, the information presented (e.g., the region with the images, audible summaries of categories of items, etc.) is at low resolution. Thus, transmitting this information uses relatively less network bandwidth and computational resources than other prior solutions, while still allowing the user access to all of the information locally at the user device. When the user zooms or pans through the information, the server receives a request for higher resolution information and sends it to the user device. Thus, any additional network bandwidth and computer resources that are consumed, may correspond with just the sufficient amount to provide the additional/high resolution information to the user device. This may help optimize (e.g., minimize) bandwidth and computational resource usage while allowing information discoverability.

FIG. 1 illustrates an illustrative flow for managing data described herein, according to at least one example. The process 100 can begin with providing a region at 102. For example, a computer system 104 can interact with a data store 106 to access information about items available to order. The data store 106 may comprise item information about the item (e.g., audible or visual representations of the item such as audible descriptions of the item, images, videos, animations, and the like, description, manufacturer, item identifier, price, specifications, item provider, etc.). Other types of information may be stored with the data store 106 without diverting from the scope of the disclosure. Images of the item may be displayed on the map which may be displayed within a network document 108 by a network application. In an example, the network document 108 may be a web page. The network document 108 may be provided via a network connection for access by a user device 110 through a network application. Images are used as an illustrative example of visual representations. However, the embodiments of the present disclosure are not limited as such and include other types of visual representation, such as videos, and animations. The representations may be provided through an augmented or virtual reality device, as illustrated with at least FIGS. 7-9, or audibly, as illustrated with at least FIG. 10.

The network document 108 provided by the user interface may display a region (e.g., a white or black plain interface, a geographic map, etc.). The region may be presented in various formats, including a two-dimensional white background with what appears to be low resolution images (e.g., visual representations 114) throughout the white background. The white background may comprise thousands of visual representations 114 in no apparent order or grouping. In some examples, the region may comprise an image of geography, as illustrated with FIG. 3, a virtual reality environment, as illustrated with FIGS. 7-8, an augmented reality environment, as illustrated with FIG. 9, or an audible environment, as illustrated with FIG. 10. In any of these examples, the region may enable a user interaction to access higher resolution and additional details (e.g., more detailed geographic regions, more detailed visual representations 114, etc.).

The interaction may include a request to change a resolution of a portion of the region 112. The request may correspond with one or more requests to increase the resolution of the visual representations 114 (e.g., by scrolling, tapping on an "increase resolution" tool, panning, zooming, etc.). With each request to increase the resolution, the visual representations 114 may appear to form images of items available from a storage facility of items. The items in the storage facility may be categorized, so that each item corresponds with one or more categories (e.g., goods/services, electronics, brand names, manufacturers, item providers, etc.). The appearance may be enabled by the network document enlarging the visual representations 114 or providing new images (e.g., image tiles, replacement images, etc.) in response to the request. In the audible example, the changes to resolution may provide more detail for the audible representations of the items (e.g., low resolution is a number of items by category whereas a higher resolution is detail about a specific item in the category, etc.).

The visual representations 114 may include a photograph of an item (e.g., with a white background, a low or high resolution image of the item captured by a camera and stored at the data store 106, etc.). Other visual representations are possible as well, including images of the item at multiple, different angles, or various two-dimensional (2D) images of the item placed together to form a three-dimensional (3D) image of the item. In some examples, an icon or caricature of the item may be identified and used as the visual representations 114. The visual representations 114 may be provided with the network document 108 for access by a user device 110. When presented at a higher resolution, the 2D or 3D the visual representation may be provided and the user device may interact with the images (e.g., rotating a 3D image, etc.).

The user device 110 may receive the visual representations when the user device 110 interacts with a portion of the map provided by the network document 108 (e.g., a webpage, a website, a network page, etc.). For example, the user device 110 may request to view the map. The computer system 104 may access one or more visual representations 114 and one or more maps from the data store 106. The computer system 104 may transmit the map and at least a subset of the visual representations to the user device 110 for temporary storage. This may include allowing the user device 110 to download all of the visual representations 114 to the user device 110 to avoid latency issues as the user pans throughout the map. In some examples, when the network document 108 is first provided to the user device 110 for display and interaction, the network document 108 may provide the visual representations 114 to the user device 110 as well.

In some examples, the computer system 104 may transmit a network document 108 to the user device 110. The network document 108 may include a script and one or more placeholders (e.g., Hypertext Markup Language (HTML) objects or element, etc.) for images. The placeholders may include active links to the images. At a high resolution, the active links may retrieve low resolution images from the computer system 104. As the user zoom in, the network document 108 may run the script to determine a new resolution. The script may also determine which of the placeholders are in view (or which image links) and may report this information to the computer system 104. Then, the computer system 104 can send one or more high resolution images corresponding with the active links in the placeholders that are in view. In some examples, the network document 108 can provide all of the items at the lowest resolution level, which can minimize bandwidth and resource usage.

As the user starts to change the resolution by zooming in and move around the network document 108, two things may happen. First, information may be sent to the computer system 104 that identifies the zoom in and the placeholders of the items/images. The computer system 104 can return higher resolution images of these items only. The network document 108 may then display these higher resolution images. Second, in some examples, the user may continue to interact with the network document 108 after zooming into a particular area of the network document 108. This may include (i) the user zooms out, (ii) the user zooms in even more, or (iii) the user pans to another area of the map at the same zoom level. Depending on any of these, the computer system 104 can be proactive and send the right images to the user device 110 before the actual user interaction. This way, as soon as the user interaction actually occurs, the proper images are already available locally to the user device 110, which minimizes any latency and improves the user experience.

In some examples, when the user changes a resolution level for the representations (e.g., zooms out or in, requests more or less detail audibly, etc.) (i), the higher resolution images may already be available and stored in a local memory of the user device 110, so the computer system 104 need not be proactive. In some examples, when the user zooms in even more (ii), it may be difficult to predict the next resolution adjustment level and/or the area that the user will focus on. So, the computer system 104 may not need to be proactive. In some examples, the computer system 104 can send at least a plurality of the next highest or lowest resolution levels of the items currently being presented. As far as the user panning to another area of a region at the same zoom level (iii), the user can move in four directions (for a 2D) map. So, the computer system 104 can determine items that are not currently being presented, but that are adjacent to the items currently being presented. The computer system 104 may proactively send images or audible descriptions of these adjacent items at the current resolution level.

In some examples, the computer system 104 may transmit multiple representations 114 that correspond with a source image. For example, the multiple representations may correspond with a small file size, medium file size, and large file size (e.g., relative to each other, relative to a standard image downloaded by user devices, etc.). As the user device 110 interacts with the region, the different visual representations may be provided. For example the lowest resolution level may provide the image or summarized description of items corresponding with the smallest file size for the item. As the user requests to increase or change the resolution level of the representation 114, the medium file size and then the large file size may be provided. More or fewer than three representations may be provided and stored in the data store 106 without diverting from the scope of the disclosure.

When the representations are visual, the user interface 108 may display the visual representations 114 of thousands of items at the map that may not be possible if the full visual representation of the item were to be displayed for each item. The visual representation 114 may include one or more pixels that represent the item when zoomed. The visual representation 114 may change to appear more like the item (e.g., at a higher resolution than the initial resolution, etc.). In some examples, when zoomed, the visual representation 114 may appear larger or resemble a greater resolution of the visual representation of the item before the zoom.

When the representations are audible, the user interface 108 may describe the representations 114 of thousands of items in a region that may not be possible if the full representation of the item were to be displayed for each item. The representation 114 may include one or more words describing a category of a group of aggregated items to represent the item when the item is described at the lowest resolution level. The representation 114 may audibly change to appear more like the item at a higher resolution than the initial resolution (e.g., "goods/services," then "electronics," then "around three pounds," then "desktop computer," then "Acme Co. Brand model A," etc.). In some examples, when the representation is at the highest resolution level, the representation 114 may resemble a more detailed and limited description of the representation of the item before the change in resolution.

With the initial presentation of the region, the representation 114 may be presented at the lowest resolution. As the resolution increases, the representations may present more representative features of the item and may represent a high resolution image of the item when the item is presented visually and/or more detail about the item when the item is presented audibly.

The visual representations 114 may be provided as image tiles. For example, the computer system 104 may generate and provide a low resolution image tile or other small file size visual representation 114 to represent an item. The image of the item may be updated with the data store 106 (e.g., to display an update model of the item, to represent a new item altogether, etc.). The computer system 104 may replace the original image tile with a new image tile based on the updated information. In some examples, both the original image tile and the new image tile may correspond with the item and additional item detail.

The process 100 may provide additional detail at 120. For example, the computer system 106 may receive a request to change the resolution level of the region from the user device 110. In response to the request, the computer system 106 may increase the resolution of the region and/or overlay of a subset of the visual representations over a detailed region at a second resolution. The second resolution may be higher than the first resolution. The visual representations at the second resolution 124 may be larger (e.g., correspond with more pixels, etc.) than the visual representation at the first resolution. In some examples, the representation 124 may resemble the item.

The process 100 may also provide additional information at 140. The additional information may be provided in a second network document 142 (e.g., from the same network application accessed by the user device 110, etc.) by the computer system 104. The additional information may comprise an item image 144 associated with the item. The additional detail may comprise an item image 144, item description 146, item information 148, or other details about the item displayed at the second network document 142. In some examples, the item image 144 may correspond with the visual representation 114 displayed at various resolutions within the map (e.g., the low to high resolution image, etc.). In some examples, the item image 144 may be overlaid over the detailed geographic region. The item image may be provided in response to the second request.

In some examples, the additional detail may be provided in response to the second request 124. For example, the second request may be received by the computer system from the user device 110 over the data network. The second request may correspond with a request to access information about an item of the items available from the storage facility. In some examples, the user device 110 may interact with the additional information (e.g., to order the item, to add the item to a wish list, to gift the item, to ship the item from a storage facility to another location, etc.).

Figure 2:
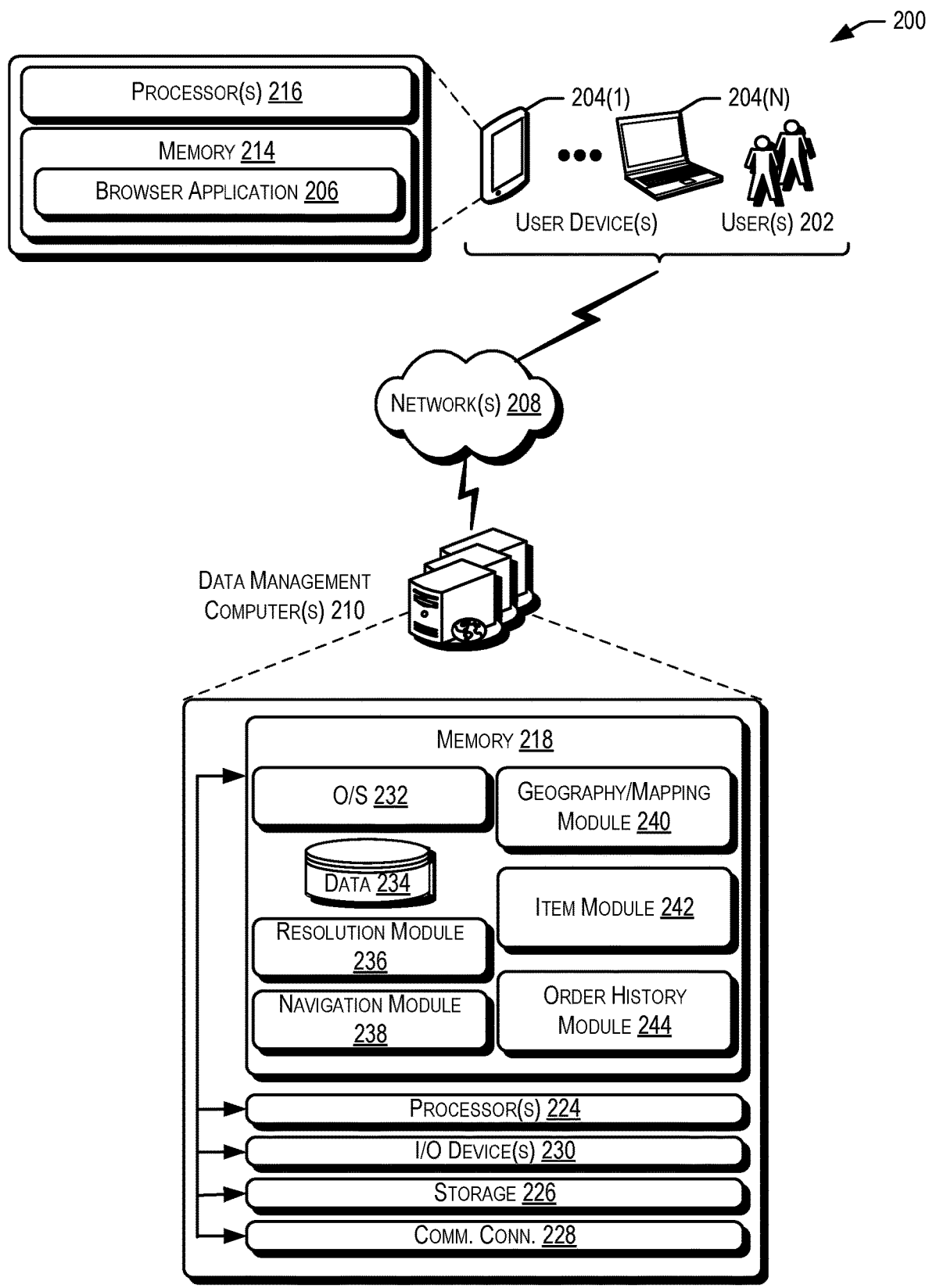
FIG. 2 illustrates an example architecture for managing data described herein that includes a data management computer and/or a user device connected via one or more networks, according to at least one example.

FIG. 2 illustrates an example architecture for managing data described herein that includes a data management computer and/or a user device connected via one or more networks, according to at least one example. In architecture 200, one or more users 202 (i.e., web browser users) may utilize user computing devices 204(1)-(N) (collectively, user devices 204) to access an application 206 (e.g., a web browser), via one or more networks 208. In some aspects, the application 206 may be hosted, managed, and/or provided by a computing resources service or service provider, such as by utilizing one or more service provider computers and/or one or more data management computers 210. The one or more data management computers 210 may, in some examples, provide computing resources such as, but not limited to, client entities, low latency data storage, durable data storage, data access, management, virtualization, cloud-based software solutions, electronic content performance management, etc. The one or more data management computers 210 may also be operable to provide web hosting, computer application development, and/or implementation platforms, combinations of the foregoing, or the like to the one or more users 202. The one or more data management computers 210, in some examples, may help discover items by providing and interacting with visual representations of items accessed by the application 206 at one or more user devices 204.

In some examples, the networks 208 may include any one or a combination of many different types of networks, such as cable networks, the Internet, wireless networks, cellular networks and other private and/or public networks. While the illustrated example represents the users 202 accessing the application 206 over the networks 208, the described techniques may equally apply in instances where the users 202 interact with the data management computers 210 via the one or more user devices 204 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

As described briefly above, the application 206 may allow the users 202 to interact with a service provider computer, such as to access web content (e.g., web pages, music, video, etc.). The one or more data management computers 210, perhaps arranged in a cluster of servers or as a server farm, may host the application 206 and/or cloud-based software services. Other server architectures may also be used to host the application 206. The application 206 may be capable of handling requests from many users 202 and serving, in response, various item web pages. The application 206 can provide any type of website that supports user interaction, including social networking sites, online retailers, informational sites, blog sites, search engine sites, news and entertainment sites, and so forth. As discussed above, the described techniques can similarly be implemented outside of the application 206, such as with other applications running on the user devices 204.

The user devices 204 may be any type of computing device such as, but not limited to, a mobile phone, a smart phone, a personal digital assistant (PDA), a laptop computer, a desktop computer, a thin-client device, a tablet PC, an electronic book (e-book) reader, etc. In some examples, the user devices 204 may be in communication with the data management computers 210 via the networks 208, or via other network connections. Additionally, the user devices 204 may be part of the distributed system managed by, controlled by, or otherwise part of the data management computers 210 (e.g., a console device integrated with the data management computers 210).

The user device 204 may correspond with a virtual or augmented reality device or virtual reality (VR) headset. For example, the user device 204 may include one or more inertial measurement units (IMUs). An IMU may include an accelerometer(s), gyroscope(s), and magnetometer(s). An accelerometer(s) may measure movement along various axes, including the X, Y, Z axes. A gyroscope(s) may measure three-hundred sixty degree rotation. A magnetometer(s) may determine orientation towards a magnetic field. Each of these components may transmit communications with at least one memory 214 and one or more processing units (or processor(s)) 216 of the user device 204. Based on the IMUS, the user device 204 may sense different data associated with user interactions with the user device 204. For instance, translational movement, rotational movement, and/or orientation may be determined.

The user device 204 may correspond with a microphone and speaker that are incorporated with the user device 204. For example, the user device 204 may receive audio input through a microphone incorporated with the user device 204 and provide audio output through a speaker incorporated with the user device 204. Each of these components may transmit communications with at least one memory 214 and one or more processing units (or processor(s)) 216 of the user device 204. In some examples, interactions with the user device 204 may include audio commands utilizing the microphone of the user device 204. Any representations provided by the user device 204 may include audio presentations of information, including a first resolution level being a summary of a plurality of items available from the one or more storage facilities and a second resolution level being more detail than the first resolution level.

The user device 204 may correspond with a profile. The profile of the user device 204 may identify device information (e.g., a telephone number, nickname, International Mobile Equipment Identity (IMEI), Mobile Equipment Identifier (MEID), Electronic Serial Number (ESN), International Mobile Subscriber Identity (IMSI), etc.) or information about one or more users operating the user device 204. The profile may also include a location of the device relative to an environment of the user (e.g., the device is located in a living room of the user's house). When the user device 204 provides a summary of the items, the summary may correspond with a profile of a user operating the computing device or the computing device (e.g., associated with an order history, or search history, etc.).

In one illustrative configuration, the user devices 204 may include at least one memory 214 and one or more processing units (or processor(s)) 216. The processor(s) 216 may be implemented as appropriate in hardware, computer-executable instructions, firmware, or combinations thereof. Computer-executable instruction or firmware implementations of the processor(s) 216 may include computer-executable or machine-executable instructions written in any suitable programming language to perform the various functions described. The user devices 204 may also include geo-location devices (e.g., a global positioning system (GPS) device or the like) for providing and/or recording geographic location information associated with the user devices 204.

The memory 214 may store program instructions that are loadable and executable on the processor(s) 216, as well as data generated during the execution of these programs. Depending on the configuration and type of user device 204, the memory 214 may be volatile (such as random access memory (RAM)) and/or non-volatile (such as read-only memory (ROM), flash memory, etc.). The user device 204 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 214 may include multiple different types of memory, such as static random access memory (SRAM), dynamic random access memory (DRAM), or ROM.

Turning to the contents of the memory 214 in more detail, the memory 214 may include an operating system and one or more application programs or services for implementing the features disclosed herein, such as via the browser application 206 or dedicated applications (e.g., smart phone applications, tablet applications, etc.). The browser application 206 may be configured to receive, store, and/or display a website or other interface for interacting with the data management computers 210. Additionally, the memory 214 may store access credentials and/or other user information such as, but not limited to, user IDs, passwords, and/or other user information. In some examples, the user information may include information for authenticating an account access request such as, but not limited to, a device ID, a cookie, an IP address, a location, or the like. In addition, the user information may include a user 202 provided response to a security question or a geographic location obtained by the user device 204.

In some aspects, the data management computers 210 may also be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider computers are executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. In some examples, the data management computers 210 may be in communication with the user devices 204 and/or other service providers via the networks 208, or via other network connections. The data management computers 210 may include one or more servers, perhaps arranged in a cluster, as a server farm, or as individual servers not associated with one another. These servers may be configured to implement the content performance management described herein as part of an integrated, distributed computing environment.

In one illustrative configuration, the data management computers 210 may include at least one memory 218 and one or more processing units (or processor(s)) 224. The processor(s) 224 may be implemented as appropriate in hardware, computer-executable instructions, firmware, or combinations thereof. Computer-executable instruction or firmware implementations of the processor(s) 224 may include computer-executable or machine-executable instructions written in any suitable programming language to perform the various functions described.

The memory 218 may store program instructions that are loadable and executable on the processor(s) 224, as well as data generated during the execution of these programs. Depending on the configuration and type of data management computers 210, the memory 218 may be volatile (such as RAM) and/or non-volatile (such as ROM, flash memory, etc.). The data management computers 210 or servers may also include additional storage 226, which may include removable storage and/or non-removable storage. The additional storage 226 may include, but is not limited to, magnetic storage, optical disks and/or tape storage. The disk drives and their associated computer-readable media may provide non-volatile storage of computer-readable instructions, data structures, program modules and other data for the computing devices. In some implementations, the memory 218 may include multiple different types of memory, such as SRAM, DRAM, or ROM.

The memory 218, the additional storage 226, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 218 and the additional storage 226 are all examples of computer storage media. Additional types of computer storage media that may be present in the data management computers 210 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the data management computers 210. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The data management computers 210 may also contain communications connection(s) 228 that allow the data management computers 210 to communicate with a stored database, another computing device or server, user terminals and/or other devices on the networks 208. The data management computers 210 may also include I/O device(s) 230, such as a keyboard, a mouse, a pen, a voice input device, a touch input device, a display, speakers, a printer, etc.

Turning to the contents of the memory 218 in more detail, the memory 218 may include an operating system 232, one or more data stores 234, and/or one or more application programs or services for implementing the features disclosed herein including a resolution module 236, a navigation graph module 238, a geography/mapping module 240, an item module 242, and/or an order history module 244. The modules may be software modules, hardware modules, or a combination thereof. If the modules are software modules, the modules will be embodied on a computer readable medium and processed by a processor in any of computer systems described herein.

The resolution module 236 may be configured to determine a resolution of an image. The resolution of the image may correspond with a low, medium, or high resolution. In some examples, the resolution of the image may correspond with 2D or 3D images of the item that are captured and stored at the one or more data stores 234 and/or at the user devices 204. Multiple resolutions may be stored and transmitted via a network connection. In some examples, the resolution module 236 may be configured to identify 3D map images to enable three-dimensional navigation in response to interactions by the user with the item images.

Once multiple resolution images are captured and stored, the one or more user devices 204 may further interact with a map. The first, lowest resolution images of a plurality of items may be provided by the resolution module 236 when the map is initially accessed. The lowest resolution images may be provided from the data store 234 or accessed directly by the one or more user devices 204 from a local storage. The one or more user devices 204 may request to increase the resolution in a portion of the map that comprises a subset of the plurality of items. Various responses may occur. For example, the resolution module 236 may instruct the application 206 to provide a second higher resolution image in response to the request to display at a network document in place of the original, lower resolution image. Alternatively, the request may be processed by the application 206 to zoom into the previously presented image. This previously presented image, in some examples, may correspond with a higher resolution image that is initially provided to the one or more user devices 204, rather than the lower resolution image.

The data management computers 210 may also comprise a navigation graph module 238. The navigation graph module 238 may be configured to determine image information based at least in part on one or more interactions with a map. For example, the one or more user devices 204 may transmit a request to pan left. The navigation graph module 238 may provide different images and map information in response to the request. The navigation may correspond with directions (e.g., North, South, East, West, etc.), absolute values, or distance (e.g. drive one mile from the start location, etc.). The navigation graph module 238 may provide locations that are customarily placed together (e.g., schools next to homes, streets next to sidewalks, etc.). The correlation information may be stored in the data store 234 based on navigation history (e.g., similar locations were provided previously in response to panning, etc.), determined correlations from analysis of existing map data, or by an administrator that identifies the correlations.

The navigation graph module 238 may also be configured to reorganize a map and/or adjust the data corresponding with interactions with the map. For example, the map may be personalized based at least in part on a user's order history data (e.g., according to a user profile or device profile, etc.). The navigation graph module 238 may reorganize the map to place the visual representations that are similar to these past orders near the center of the region or plurality of representations of items, or present them at a higher resolution next to other visual representations that are presented at lower resolutions. The order history may also correspond with other users (e.g., neighbors, users that are geographically similar, etc.).

The data management computers 210 may also comprise a geography/mapping module 240. The geography/mapping module 240 may be configured to determine a geographic region for a map. For example, the geography/mapping module 240 may receive geographic data for states, cities, countries, counties, and the like. The geographic regions of the map may correspond with actual locations or fabricated locations, either of which may be interacted with to provide more information about items in the corresponding or overlaying particular regions.

The geographic regions may be provided as image tiles by the geography/mapping module 240. A static image may correspond with a state, for example, and may be provided by the geography/mapping module 240 to present at the application 206 initially. In response to a request to increase the resolution, a second image tile may be provided that provides an image at a higher resolution corresponding with a portion of the same geographic region. The second image tile may provide data that was not previously provided, including city or county boundaries. Additional detail with image tiles may provide buildings and/or the inside of those buildings, each corresponding with a static image at a low resolution to give the appearance of zooming into the geographic region.

The geography/mapping module 240 may also be configured to determine a two-dimensional (2D) or three-dimensional (3D) map and support 2D or 3D navigation of a region. For example, multiple image tiles may fit together to generate an appearance of a 3D item. The generation of a 3D image from multiple 2D images may be implemented using processes known in the art.

The geography/mapping module 240 may also be configured to determine geographic points of interest of a map. The geographic points of interest may include the cities, states, or counties. The geographic points of interest may also include one or more buildings within the geographic areas, including icons associated with homes, schools, yards, stores, and the like.

The data management computers 210 may also comprise an item module 242. The item module 242 may be configured to store and provide one or more images (e.g., captured by a camera, etc.) or visual representations of an item (e.g., icons, images from a camera, an aggregated image based on multiple, similar images, etc.). For example, the one or more data stores 234 may store one or more images of items as a single image tile (e.g., a 2D image) or multiple image tiles (e.g., a 3D image, multiple perspectives of the same item, multiple resolutions of the item, etc.).

In some examples, the item module 242 may also be configured to update an image tile of an item after an update is received. The item module 242 may replace the image tile with a new image tile, based at least in part on the update.

The item module 242 may also be configured to categorize items. For example, the one or more data stores 234 may store item details about the items, including an item identifier, item type, manufacturer, or other information. The item module 242 may group or aggregate items based at least in part on this data.

The item module 242 may also be configured to communicate with the geography/mapping module 240 to provide visual representations of items as an overlay with the map. In some examples, the items may be grouped first by category (e.g., "household items," etc.) and the visual representations of those items may be provided with the map (e.g., an image of a room in a house or otherwise corresponding with the household, etc.).

The item module 242 and the geography/mapping module 240 may also be configured to place items as they correlate them with the map. As a sample illustration, the network document may comprise a white background. The item module 242 may receive a plurality of visual representations of items to display with the network document. The visual representations may be organized equidistant from each other, at absolute value positions with in the network document, or through the use of a placement algorithm to identify a new location on the network document that is not currently filled by another visual representation (e.g., a hashing function, a random number generator algorithm, etc.). The visual representations of items may be placed within or outside of the displayable area of the user interface, so that the user may interact with the user interface to zoom, pan, and scroll to other areas of the network document to access the visual representations of items that are outside of the initially viewable area.

In another example, the network document may include a frame with an image of a living room in a map. The frame may accept a visual representation of the item from the item module 242 that would customarily be placed in a living room, by matching a category for the network document (e.g., image of a "living room") with a category for the item (e.g., image of an item to place in a "living room"). Additional details of the placement of the item throughout the map may be further defined by categories as well (e.g., "living room wall," etc.). The item module 242 may receive an identification of the category of the frame with the network document that is empty, then request a corresponding item from data store 234 that matches that category. When the item is determined, the item module 242 may overlay the item with the network document in the frame, or render the network document to include the visual representation.

The item module 242 may also be configured to determine similarities between items. For example, the items may correspond with a plurality of images, including front, back, top, bottom, etc. The images of the item may be compared with the images of another item to identify similarities (e.g., the front image of both items have two sleeves, so the items that correspond with the images are likely similar, etc.). The determined similarities between the items may be used to update a category (e.g., "clothing") or attribute (e.g., blue, long sleeve, etc.) of the item.

The item module 242 may also be configured to identify deals, sales, or other notifications associated with one or more items. The item module 242 may store details about the notifications, including when a sales starts and ends, the number of items ordered during the sale, and the number of items remaining in storage facilities that are available to be ordered by users (e.g., if quantities are limited, etc.).

The item module 242 may also be configured to determine one or more items in a storage facility. For example, the data store 234 may comprise location information for a physical item associated with a visual representation provided by the network document. The item module 242 may limit the items provided by the network document based at least in part on the items available in the storage facility.

The data management computers 210 may also comprise an order history module 244. The order history module 244 may be configured to determine one or more user interactions with items. The user interactions may correspond with one or more users and comprise ordering an item, selecting an item, accessing an item detail page, and the like. The order history module 244 may interact with the geography/mapping module 240 to filter the visual representations of items displayed by the geography/mapping module 240 to items related to the items determined by the order history module 244 (e.g., from the user, from other users, etc.).

The order history module 244 may also be configured to reorganize a map based at least in part on the interactions with the item (e.g., by transmitting instructions between the order history module 244 and the geography/mapping module 240, etc.). The map may be reorganized based at least in part on the order history data.

The order history module 244 may also be configured to determine a frequency of interaction with an item (e.g., hot and cold deals, etc.). For example, the order history module 244 may determine that item identifier A100 is ordered greater than a threshold number of items (e.g., more than 5 orders in one day, etc.) or greater than an average of other items (e.g., a top selling item of all items in a category, etc.). By exceeding a threshold value, the item may be associated with a desirable item and the map may place the item in a different location to highlight or hide the item.

Figure 3:
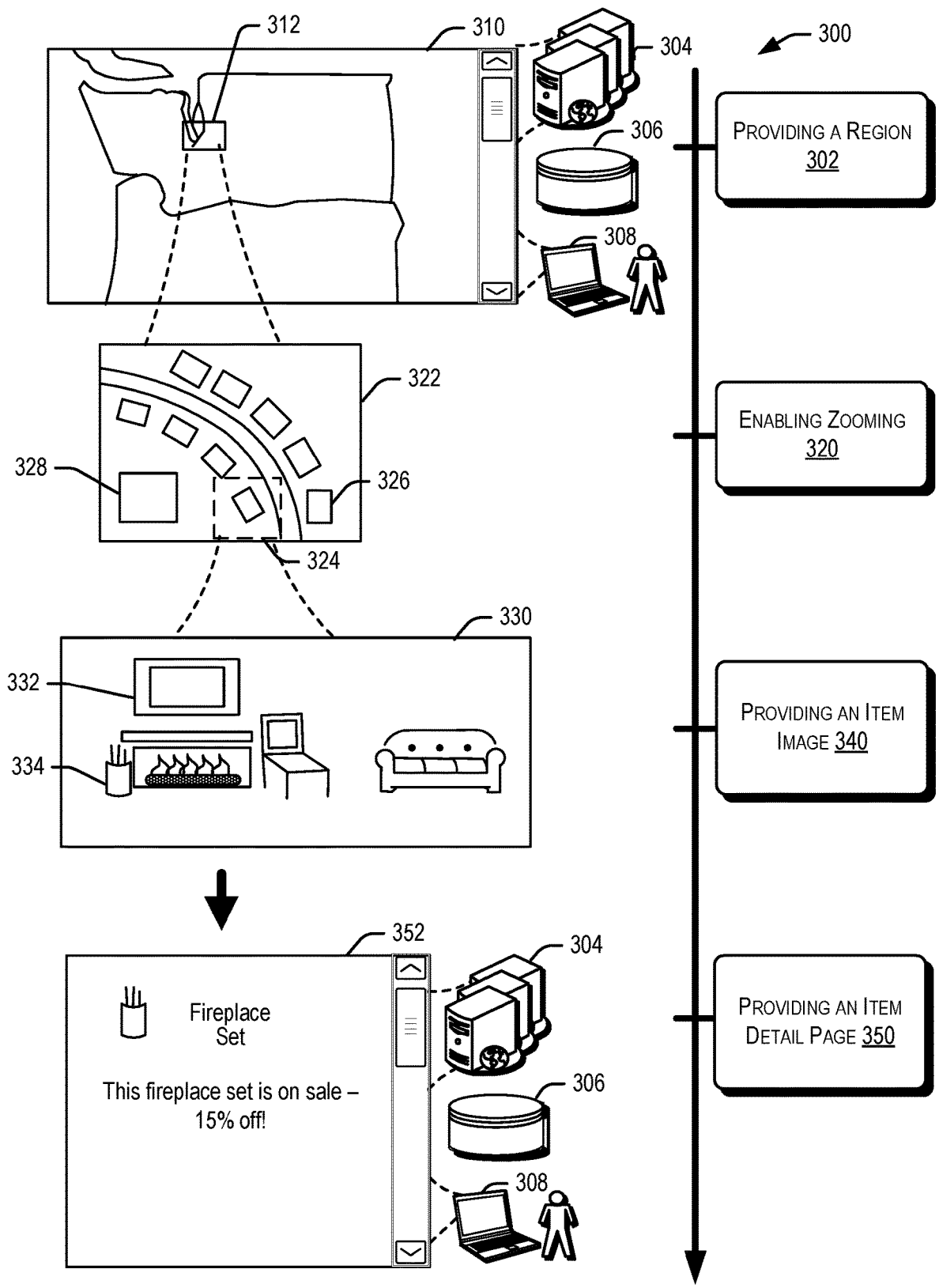
FIG. 3 illustrates an illustrative flow for managing data using a map described herein, according to at least one example.

FIG. 3 illustrates an illustrative flow for managing data using a map described herein, according to at least one example. The process 300 may begin with providing a region at 302. The region may comprise a geographic region of a map, a region of a building or a bookshelf, a region of aisles in a store, a region of an augmented or virtual reality environment, and the like. Additional examples of regions are provided throughout the figures, including at FIG. 9. Thus, although a geographic region of a map is illustrated with FIG. 3, the disclosure should not be limited to such an embodiment.

At 302, the computer system 304 can interact with a data store 306 to access an image of a map that displays a geographic region. The map may be provided and displayed at a network document 310 that is accessible by the user device 308. The computer system 304, the data store 306, and user device 308 may be similar to the one or more data management computers 210, the one or more data stores 234, and one or more user devices 204, respectively, of FIG. 2. The region may be a single image tile or multiple image tiles that are placed together to display the region.

The network document 310 may display one or more geographic regions at a first resolution. For example, the network document 310 may display a first resolution that corresponds with a state-level resolution. As the resolution increases, counties or cities may be identified. As the resolution decreases, countries or continents may be identified. Other geographic regions may be used without diverting from the essence of the disclosure.

In some examples, network document 310 may associate geographic regions with a particular category of items. For example, the user may pan the map from a current view to a portion of Africa that is associated with fashion. The user may zoom into the area to find particular buildings, designers, items, and the like. The user may pan the map to another area associated with fashion (e.g., New York, Milan, Australia, etc.). The user may interact with the map to receive additional detail about the items in that geographic region.

The computer system 304 may enable interaction with the image of the map, including zooming or panning into a portion of the map 312, at 320. The network document 310 may provide a first image at a first resolution and receive a request to change the resolution of the region (e.g., zoom into or out of the region, etc.) or pan to a particular location of the region. A second image may be provided of the map that comprises either a larger version of the original image, or a different image at a higher resolution. Additional detail may be provided at this higher resolution. The image of the map at the higher resolution 322 may provide homes 326, schools 328, and other detail that may not be displayed at the lower resolution. The higher resolution 322 may again enable interaction with at least a portion of the map 324.

In some examples, the map may correspond with a geographical region other than buildings in cities, counties, and states. For example, the geographical region may include a grocery store. The image of the map may correspond with the outside of the grocery store or an image of the front entrance of the physical brick and mortar store.

The map may comprise images other than geographic regions. For example, the map may include an image of letters or numbers. The interactions with the initial letters, for example, may zoom into the letter to provide items that begin with that letter. As an illustration, the image of the first network document may include a "T." When the user interacts with the "T" (e.g., by zooming into the image, etc.), the computer system 304 may provide images of items that begin with "T" including, for example, a television and a t-shirt.

The data store 306 may comprise the images and other item information provided with the map (e.g., description, manufacturer, item identifier, price, specifications, item provider, images of the item, etc.). Other types of information may be stored with the data store 306 without diverting from the scope of the disclosure. Images of the item may be displayed on the map which may be displayed within a network document by a network application 308.

The process 300 may provide an item image at 340. The image of the map 330 may comprise additional detail at a higher resolution than the previous map, including the inside of a house with items like a television 332 or fireplace set 334. The higher resolution image may be provided after an interaction with a portion of the map 324 or after a request to receive additional information about the portion of the map 324. The map may also show items outside the home, including camping gear or other items outside of a home, but at a similar resolution as the items inside the home like the television 332 or fireplace set 334.

The visual representations of the items may be provided based in part on the category of the item stored in the data store 306. For example, the television 332 or fireplace set 334 may correspond with a category of "living room" and the image of the map provided as image of the map 330 may correspond with the category of "living room." When the categories of the map and the item are compared and match, the image may be provided with the map.

The visual representations of the items may be provided based in part on an image comparison algorithm. For example, the visual representations of televisions may be similar to cause the algorithm to compare the pixel composition of each image. The visual representations of the items may be similar based at least in part on various similarities between the images, including, for example, four corners, black plastic, and glass in the center of the black plastic square. Other visual characteristics may be compared and used by the computer system 304 to determine physical similarities between the items.

The process 300 may provide an item detail page at 350. For example, the computer system 304 may receive a request for information about the fireplace set 334 when the user interacts with the user interface (e.g., clicking, tapping, etc.) or the image of the map 330. The user device 308 transmits the request to the computer system 304, the computer system 304 searches for item details in the data store 306 by matching an item identifier associated with the visual representation of the item in the image with an item identifier stored in the data store 306. When a match is found, the computer system 304 may provide the second network document 352 with the item details at the user interface for the user device 308.

In some examples, the second network document 352 may provide an ability to order the item within the second network document 352. The second network document 352 may provide the ability to order the item, add the item to a wish list, order the item as a gift, and the like.

Figure 4:
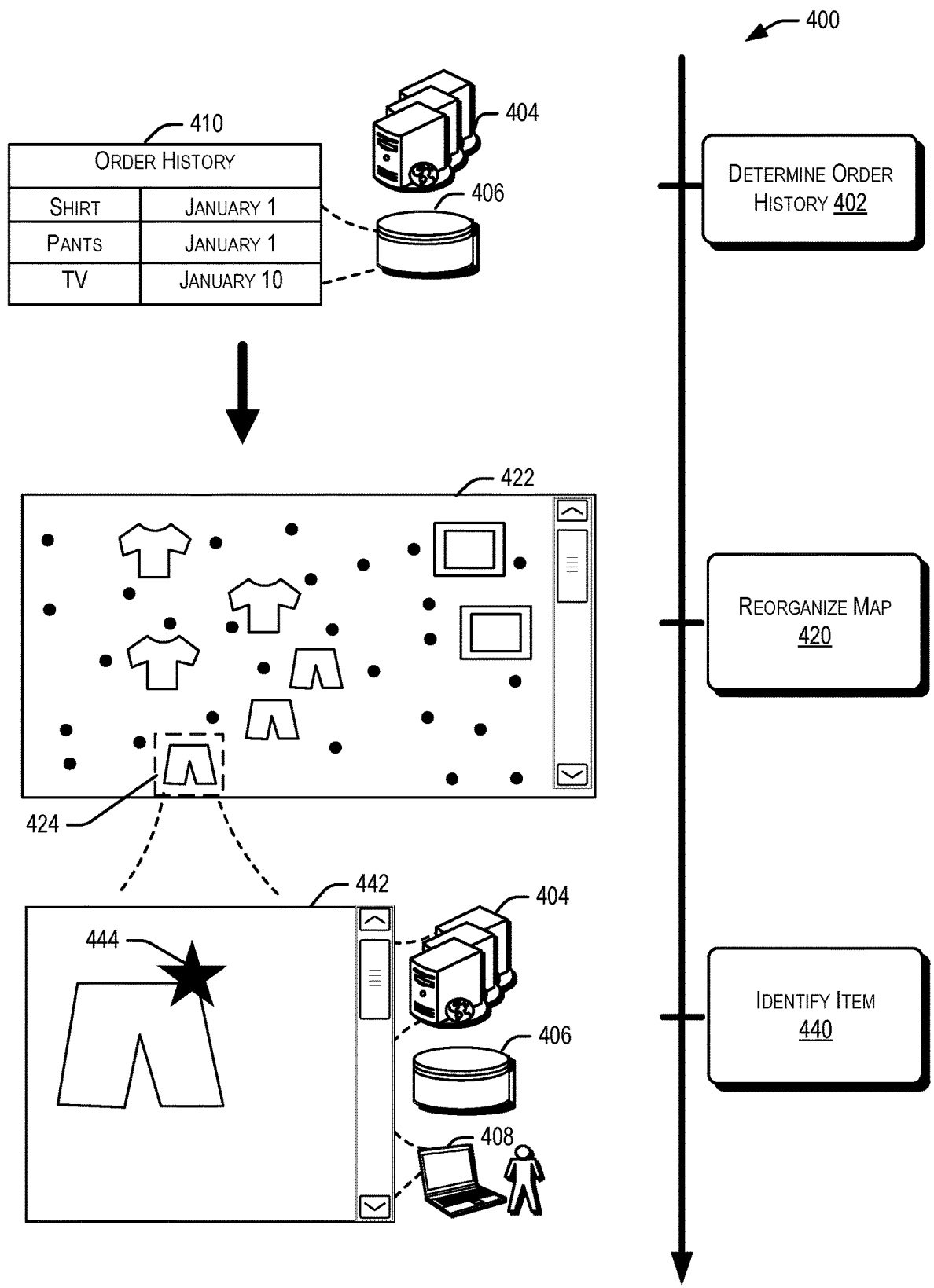
FIG. 4 illustrates an illustrative flow for managing data using past data described herein, according to at least one example.

FIG. 4 illustrates an illustrative flow for managing data using past data described herein, according to at least one example. The process 400 may comprise determining an order history at 402. For example, a computer system 404 may interact with a data store 406 to determine order history data 410. The computer system 404 and the data store 406 may be similar to the one or more data management computers 210 and the one or more data stores 234 of FIG. 2. The order history data 410 may comprise past orders from one or more users operating one or more user devices 408, including item information, dates of orders, or other relevant information.

The order history data 410 may be used to reorganize the map at 420. For example, the computer system 404 may provide a first network document with visual representations to display at a user interface accessed by the user device 408. The network document may provide the visual representations without order or categorization.

In some examples, the computer system 404 may reorganize the visual representations in a second network document 422 based at least in part on the order history data 410. The visual representations may be reorganized by grouping the representations of the items (e.g., by computer system 404 determining and comparing the category, by an image or pixel comparison algorithm, etc.). The grouping may be provided with the second network document 422 so that the grouped visual representations are provided within a proximate distance of each other. In some examples, the visual representations that correspond with the order history data 410 may be grouped by a shared category and provided with the second network document 422.

In some examples, the computer system 404 may filter or remove visual representations from the second network document 422. For example the order history data 410 may comprise items associated with electronics but not items associated with clothing. The computer system 404 may first identify all items for display with the second network page 422 and then remove any items associated with a particular category (e.g., "clothing"), based on the order history data 410. In some examples, the filtering and removal of visual representations from the second network document 422 may correspond with a request from the user device 408 to remove these items (e.g., user preferences, user profile, etc.).

In some examples, the filtering may remove items based in part on other users' order history data. For example, a user may be associated with geographic region A and neighbors within that geographic region may correspond with, for example, umbrellas. The computer system 404 may highlight this item and other similar items, or remove items that are not related to this item. In some examples, the user may interact with the second network document 422 to request the filter (e.g., to request that the second network document 422 show items that the neighbors are ordering, etc.).

The process 400 may aggregate the number of items displayed by the map. For example, the order history data 410 may comprise data by geographic region. The items associated with a particular category may be identified as an option to search within the second network document 422. As a sample illustration, the user may request that the second network document 422 display items associated with a particular geography or users within a region. The computer system 404 may aggregate items based at least in part on categories associated with the items. The aggregated items may correlate categories of items that match the request from the user, and display the visual representations of a category of items (e.g., an icon, a generic image of a television or t-shirt, etc.). The user device 408 may interact with the visual representations of the category of items to access individual items associated with the category.

As another sample illustration, the 2D image of an item (e.g., an umbrella, etc.) may be provided in the middle of the map and/or the center of the user interface. In other examples, the second network document 422 may display the image of the item larger than other items or highlight the image of the item (e.g., blinking, a different color than other images, black and white vs. color images, etc.).

In some examples, the representations of the items may be available and/or categorized when available from a storage facility. For example, the representations of a first and second item may be provided in a region of a map and each of the items may correspond with a category. The second network document 422 may correlate portions of the second network document 422 with the categories. For example, as illustrated in FIG. 4, the left portion of the second network document 422 may provide items related with the category of "clothing" and the right portion of the second network document 422 may provide items related with the category of "electronics."

The process 400 may identify the item at 440. For example, the computer system 404 may receive a request for additional information 424 and provide the additional information at a second network document 442. The second network document 442 may allow additional interactions by allowing the user device 408 to zoom to a particular visual representation, pan to a visual representation that is not provided within the initial display, or interact with a particular item. The interaction may activate a flag 444 for the item (e.g., star, heart, etc.). The activation of the flag 444 may add the item to wish list or reorder the item from an item provider. The item may ship from a storage facility in a storage container provided by a vehicle. The second network document 442 may be further reorganized based in part on these and other interactions.

Figure 5:
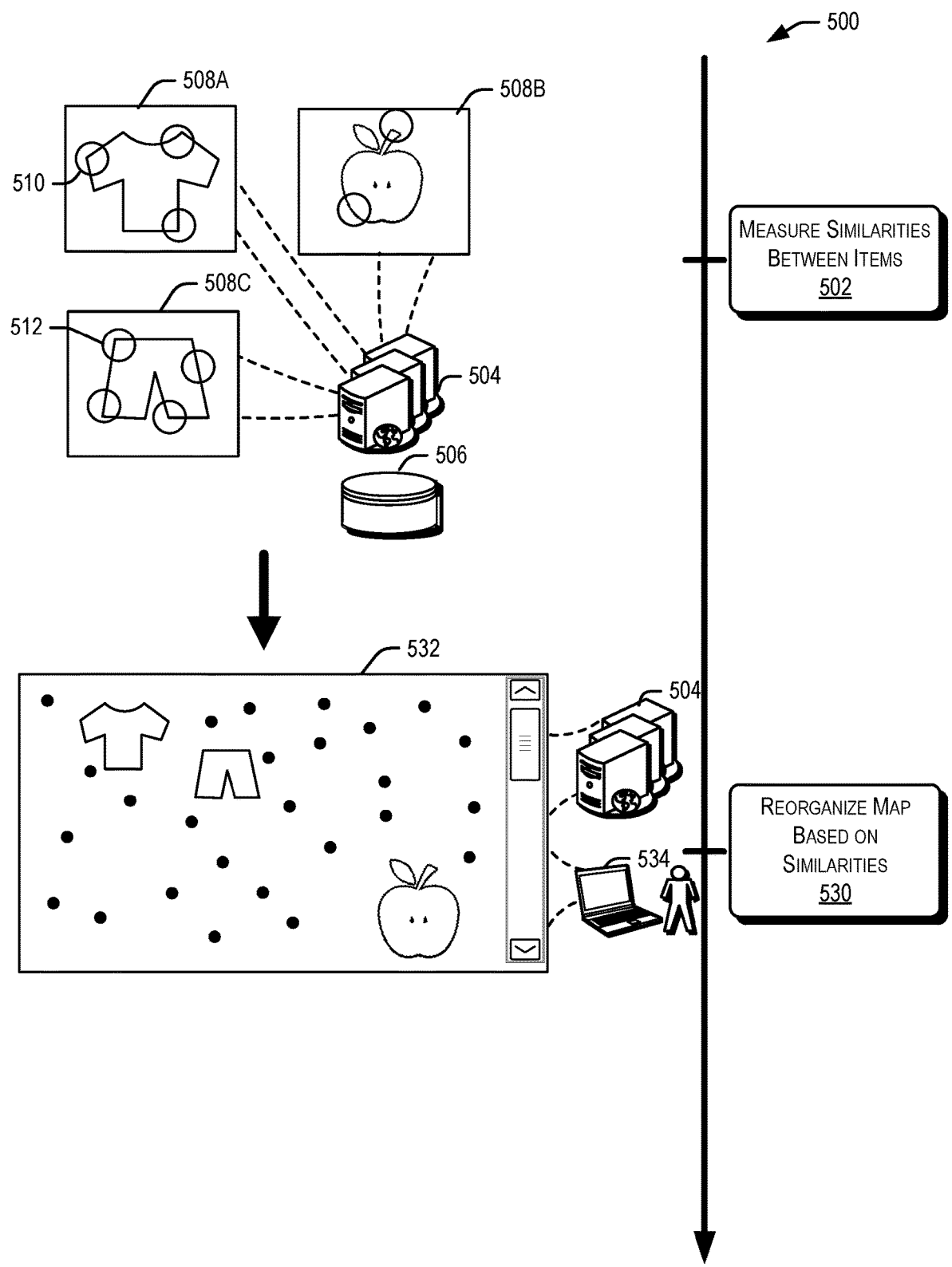
FIG. 5 illustrates an illustrative flow for managing data by comparing similarities between items described herein, according to at least one example.

FIG. 5 illustrates an illustrative flow for managing data by comparing similarities between items described herein, according to at least one example. The process 500 may comprise measuring a similarity between items at 502. For example, a computer system 504 may interact with a data store 506 to access visual representations of items and determine the similarities between the visual representations. The computer system 504 and the data store 506 may be similar to the one or more data management computers 210 and the one or more data stores 234 of FIG. 2.

The data store 506 may store a plurality of images, including front, back, top, bottom, etc. for an item. The computer system 504 may compare the images of another item to identify similarities (e.g., the front, 2D image of both items have two sleeves, so the items that correspond with the images are likely similar, etc.).

In some examples, the items may be scanned at a constant ratio across all items and then compared. For example, a camera may capture one or more images of each item as the item is a placed on a grid with a white background. Multiple angles of the image may be captured of the item and stored in the data store 506. The camera may be placed at a consistent distance from the item to capture the image of the item, so that the images of the items may be compared with some consistency.

The computer system 504 may communicate with the data store 506 to access these captured images. The images of items 508 may be compared and similarities may be determined. For example, the computer system 504 may identify the images of items 508 (displayed as 508A, 508B, and 508C). The images 508A and 508C may be similar when the computer system 504 determines that a portion of the images 510 is within a threshold difference of pixels as another portion of the image 512. The similarities may comprise fabric similarities, prime attributes of the items (e.g., edges, corners, etc.), or other item information stored in data store 506 that may or may not be visible in the image (e.g. manufacturer, category, etc.). Other images 508B may be compared and similarities between these images may be less than a threshold (e.g., different textures or gradient colors of the image, etc.).

The process 500 may reorganize a region based on the similarities at 530. For example, the computer system 504 may provide the images of items 508 at a network document 532. The computer system 504 may reorganize the visual representations at the network document 532. For example, the computer system 504 may display the images 508A and 508C in a portion of the map and the other images 508B of items that are not similar in another portion of the map. The user device 534 may interact with the visual representations, as discussed herein.

The process 500 may combine images of items (e.g., when the items are determined to be similar, etc.). For example, the images that are within a threshold difference of pixels may be similar. When the images are similar, the computer system 504 may conduct a process to morph the images. For example, after computer system 504 determines that 508A and 508C are similar (e.g., within a threshold value, etc.), additional images may be generated to bridge the similarities between the images. The additional images may alter the first image 508A by one or more pixels as a new image and continue to determine these additional images until the additional images resemble the second image 508C. The computer system 504 may present the sequence of images, starting with image 508A, then to the additional images, and then to image 508C, to provide a progression of images that appear to morph from the first item to the second item.

Figure 6:
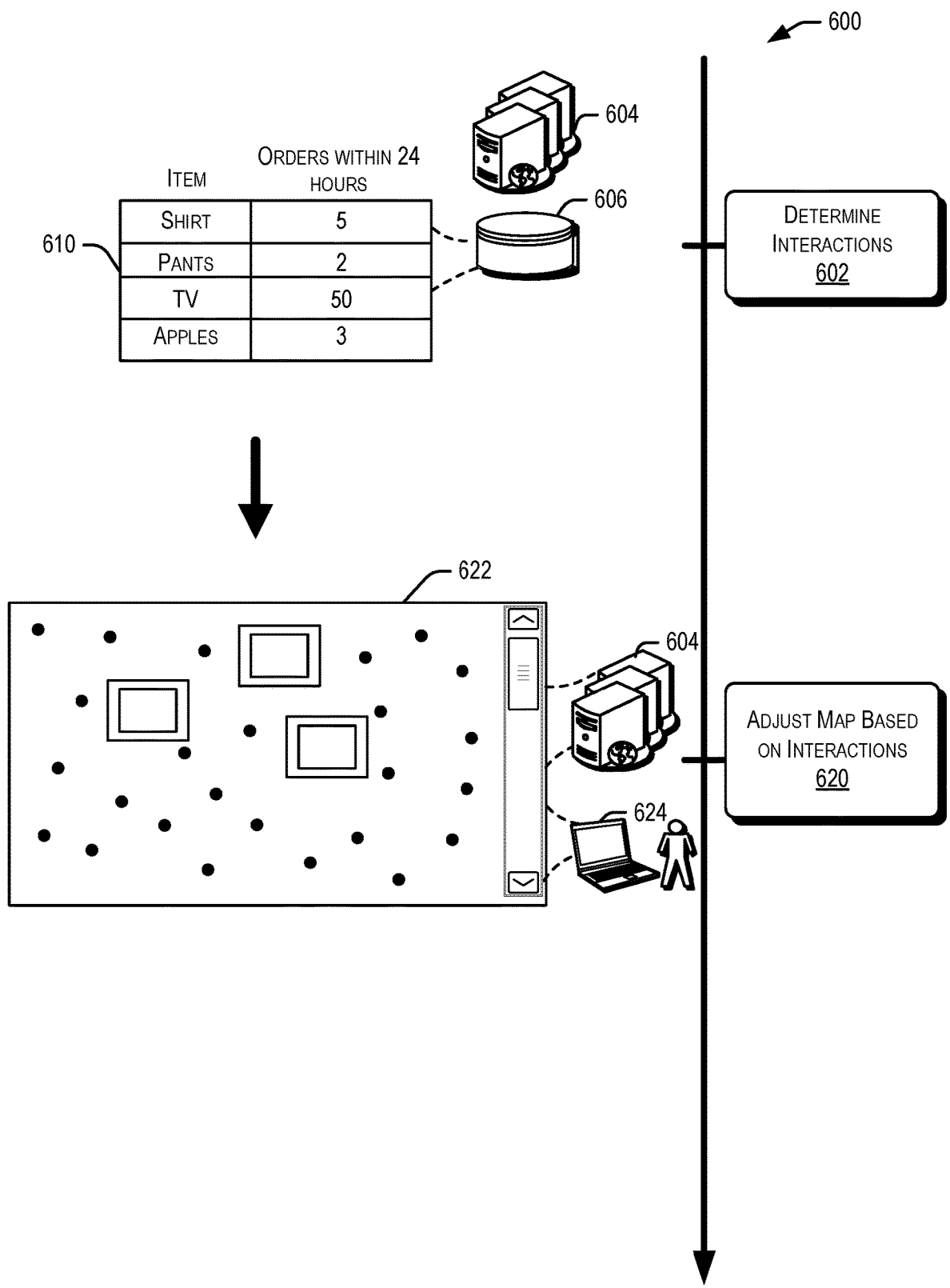
FIG. 6 illustrates an illustrative flow for managing data based on other user interactions described herein, according to at least one example.

FIG. 6 illustrates an illustrative flow for managing data based on other user interactions described herein, according to at least one example. The process 600 may comprise determining one or more interactions at 602. For example, the computer system 604 may receive an identification of one or more interactions with items within a timeframe and store the interaction data 610 in data store 606. The interactions may comprise accessing item detail for an item, adding an item to a wish list, flagging an item, ordering an item, and the like. In some examples, the interactions may be aggregated and stored in data store 606 as interaction data 610. The computer system 604 and the data store 606 may be similar to the one or more data management computers 210 and the one or more data stores 234 of FIG. 2.

In some examples, the interaction data 610 may be dynamic. For example, the interaction data 610 may comprise a percentage of items that have been ordered within a time frame, a number of coupons that are remaining and available for redemption, or other metrics discussed throughout the disclosure.

The process 600 may comprise adjusting the map based on the interactions at 620. For example, the computer system 604 may provide additional representations or a larger visual representation of the item at the network document 622 when the item is associated with more interactions than other items (e.g., or exceed a threshold value of at least five interactions in a time frame, etc.). In some examples, the map provided by the network document 622 may be reorganized to place the items with more interaction toward a center of the map (e.g., hot deals, etc.), while the items with fewer interactions may be placed farther out from the center of the map (e.g., cold deals, etc.).

Figure 7:
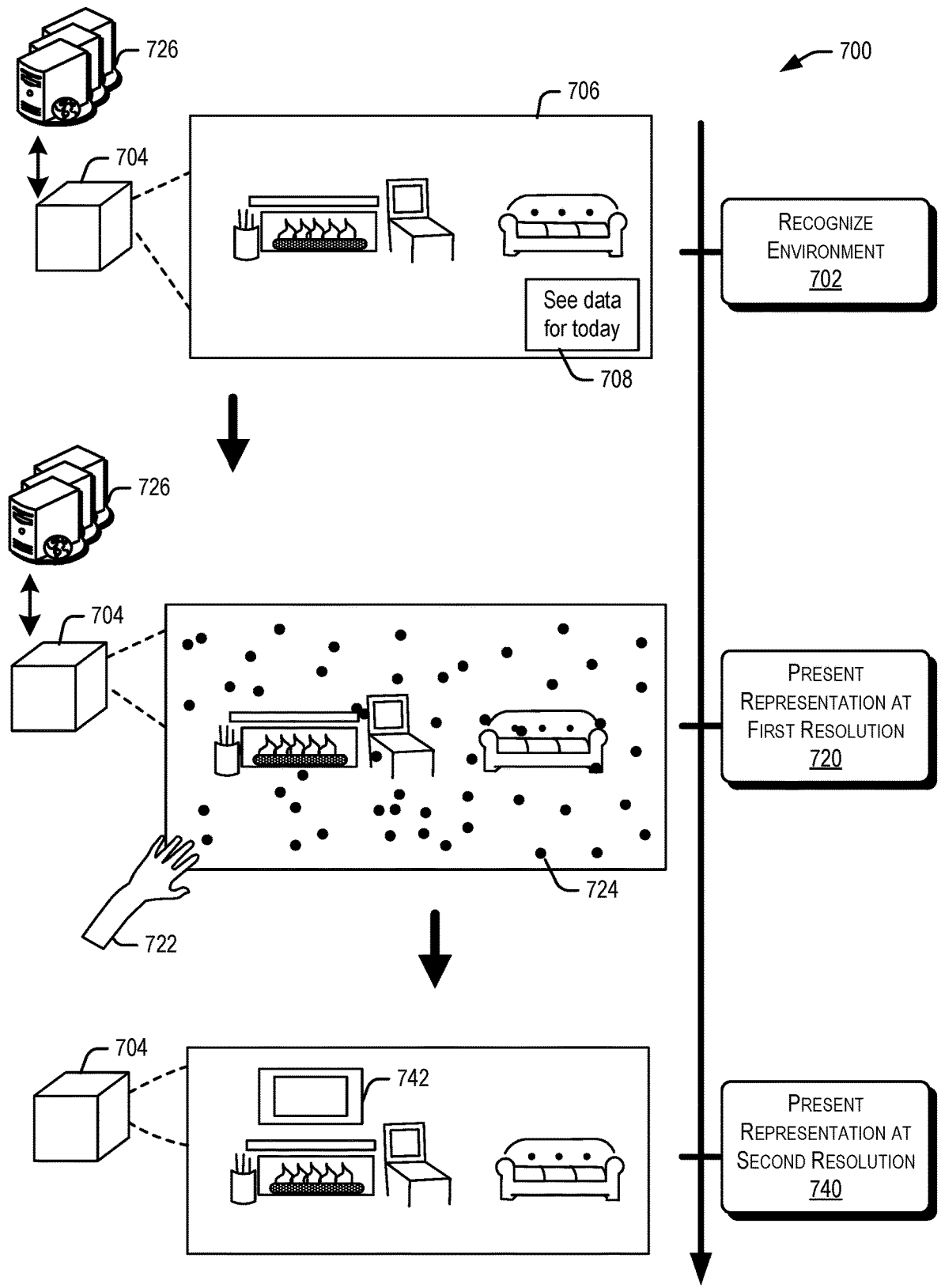
FIG. 7 illustrates an illustrative flow for presenting data described herein, according to at least one example.

FIG. 7 illustrates an illustrative flow for presenting data described herein, according to at least one example. For example, in an augmented reality environment, a data discovery process of one or more items may be based at least in part on environmental data associated with the augmented reality environment. As illustrated, when the environmental data identifies a living room, the image data presented to the user device may correspond with the category of items that are generally provided with a living room (e.g., television, couch, etc.).

The process 700 may begin by recognizing an environment at 702. For example, the user device 704 may sense environmental data through a camera or sensor that is incorporated with the user device 704. The user device 704 may sense the environmental data by receiving data provided by a real-world environment 706 within or adjacent to an area of the user device 704.

User device 704 may be implemented as a virtual reality device (e.g., a VR headset) and may be placed adjacent to or within the environment. The user device 704 may receive data associated with the environment, including capturing images of the environment or determining a location of the user device 704 (e.g., through positioning system data, user profile data, device profile data, etc.). In some examples, the environmental data may include detected data associated with movement, orientation, or positioning of the user device 704 in the real-world environment 706. For example, the environmental data may correspond with detected translational movement, rotational movement, or orientation and the navigation between different resolution levels of the virtual space.

The user device 704 may transmit the images or user profile data to computer system 726 to determine additional information associated with the environmental data. For example, the computer system 726 may perform image analysis or use a machine learning algorithm to compare an object in the real-world environment with a stock image from stored data to determine one or more similar items in the environment. The similar items may be associated with one or more categories, such that when the item is identified in the real-world environment 706, the category associated with the identified image in a data store is associated with the item in the real-world environment 706. The user device 704, computer system 726, and corresponding data store may be similar to the user device 204, one or more data management computers 210, and the one or more data stores 234 of FIG. 2, respectively.

As a sample illustration, a couch may be identified by comparing an item in the real-world environment 706 with the stored item and the couch may be identified in category "living room." When a couch is identified, the environment that comprises the couch may be determined to be a "living room" category as well.

In some example, the data may be transmitted by the user device 704 after a user 722 interacts with the environment through the user device 704. For example, the user device 704 may present a tool 708 to access additional information associated with the environment. The tool 708 may communicate with a computing device via a communication network to receive one or more item images and present them with the environment to augment the real-world environment 706. In some examples, an indication of the interaction with the first visual representations of the items at the first resolution level are not through the tool 708, but rather based at least in part on detected translational movement, rotational movement, or orientation.

The computer system 726 can also receive one or more visual representations of items available from a storage facility from a data store, as discussed throughout the disclosure. The computer system 726 may determine these visual representations based in part on the environmental data and/or determine a subset of visual representations of items based in part on the environmental data provided by the user device 704.

The computer system 726 can transmit visual representations of items associated with the environmental data to the user device 704 for presentation by a user interface associated with the user device 704. The computer system 726 can instruct the user device 704 to present visual representations of the items at varying resolution levels based on interactions, environmental data, profile data, and the like. For example, when the user device 704 is a virtual reality device (e.g., VR headset, etc.), the visual representations of the items may be provided by a user interface of the user device 704 or projected to a space by the user device 704 to form the augmented reality environment.

At 720, one or more representations of items may be presented at a first resolution. For example, the visual representations may be transmitted over a data network by the computer system 726 to the user device 704. The user 722 may interact with these first visual representations by clicking, tapping, swiping, blinking, walking in a certain direction, changing a head orientation, etc. The interaction may request to adjust the resolution for one or more items to a second resolution. Based at least in part on the interactions by the user 722, the user device may transmit an indication of one or more interactions with the visual representations to the computer system 726 over the data network. The computer system 726 can transmit second visual representations of at least a subset of items back to the user device 704. The second visual representations may be at a higher resolution than the first resolution, as discussed throughout the disclosure.

At 740, one or more representations of items may be presented at a second resolution. For example, the after the computer system 726 transmits the second visual representations of at least a subset of items to the user device 704, the user device 704 may present these representations for the user 722 to interact with. When the user 722 interacts with one of them, a particular item and the item image may be presented at the second resolution 742. The item image at the second resolution 742 may be a greater resolution than the first resolution. In some examples, the item image may be presented with item detail at the user interface for the user device 704, as illustrated and described with FIG. 3.

In some examples, the first visual representations of the items or the second visual representations of items may be filtered, based at least in part on the environment data or a profile of the user operating the virtual reality device or user device 704, or the computer system 726. For example, items may be used to form a subset of items when a category associated with the item matches a category associated with the environmental data or profile of the user device 704 or user operating the user device 704.

Figure 8:
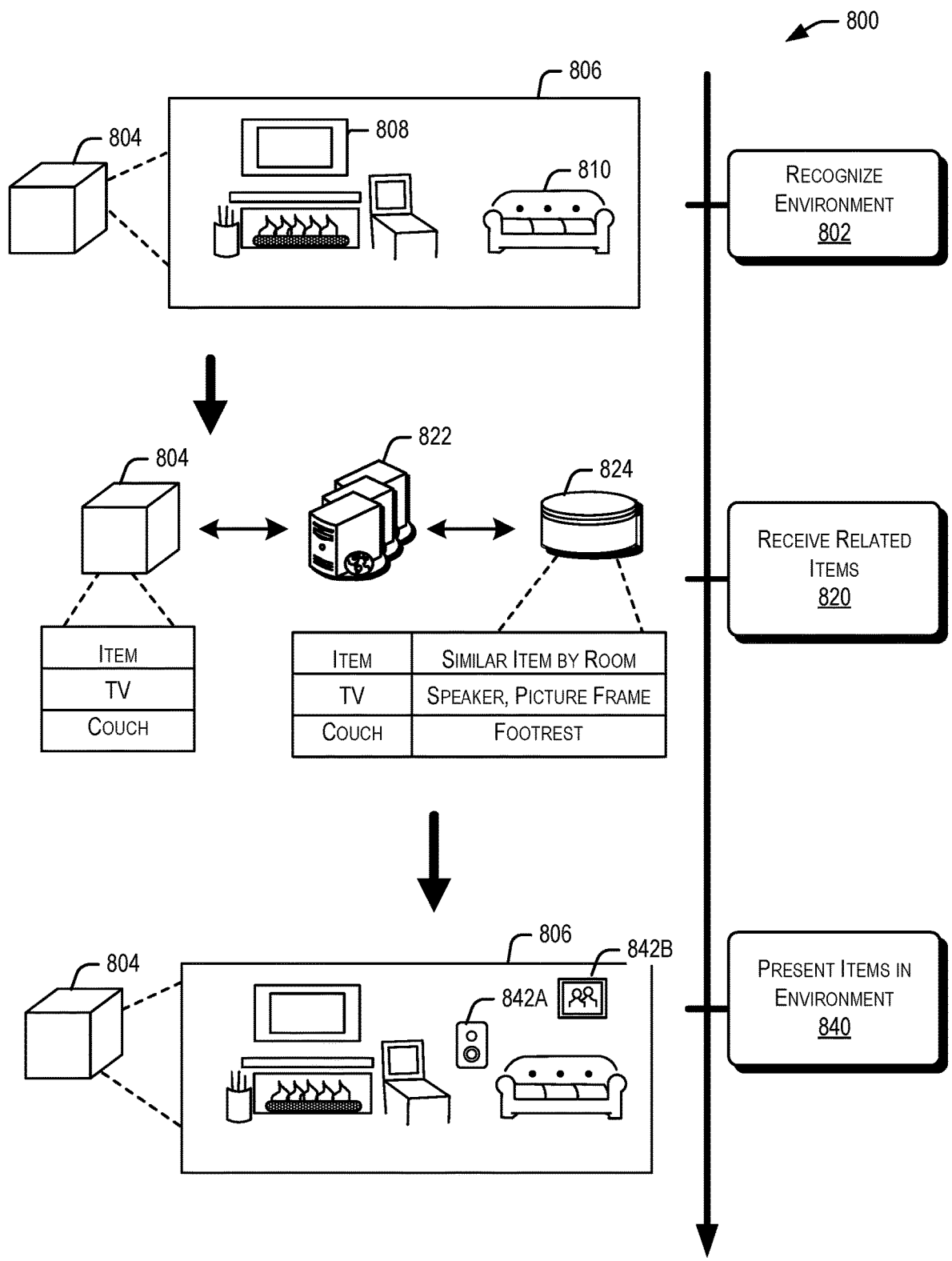
FIG. 8 illustrates an illustrative flow for presenting data described herein, according to at least one example.

FIG. 8 illustrates an illustrative flow for presenting data described herein, according to at least one example. For example, in an augmented reality environment, data discovery process of one or more items may be based at least in part on environmental data associated with the augmented reality environment. When the environmental data identifies a living room, the image data presented to the user device may correspond with the category of items that are generally provided with a living room (e.g., television, couch, etc.). This process may be similar to other processes discussed throughout the disclosure and is abbreviated for ease of illustration.

The process 800 may begin by recognizing an environment at 802. For example, the user device 804 may receive environmental data through a camera or sensor that is incorporated with the user device 804. The user device 804 may receive the environmental data by receiving data provided by a real-world environment 806 adjacent to an area of the user device 804. The data may be based on detected translational movement, rotational movement, or orientation of the user device 804, or other interactions discussed herein. The user device 804, computer system 822, and data store 824 may be similar to the user device 204, one or more data management computers 210, and the one or more data stores 234 of FIG. 2, respectively.

The user device 804 may identify one or more similar items in the environment. The similar items may be associated with one or more categories, such that when the item is identified in the real-world environment 806, the category associated with the identified image in a data store is associated with the item in the real-world environment 806. In this illustration, the user device 804 may identify a television 808 and a couch 810.

At 820, items related to the items in the real-world environment 806 may be received. For example, the user device 804 may transmit communications with a computing device 822 that is in communication with at least one data store 824. The data store 824 may comprise category correlations between items and other items. For example, the television 808 and the couch 810 may correspond with other related items 842 that are similar to or used with these items. The television 808, for example, may be similar to a speaker 842A and a picture frame 842B.

At 840, items related to the items in the real-world environment 806 may be presented in the real-world environment 806. The related items 842 may be provided within a proximity to the related items in the real-world environment 806.

Figure 9:
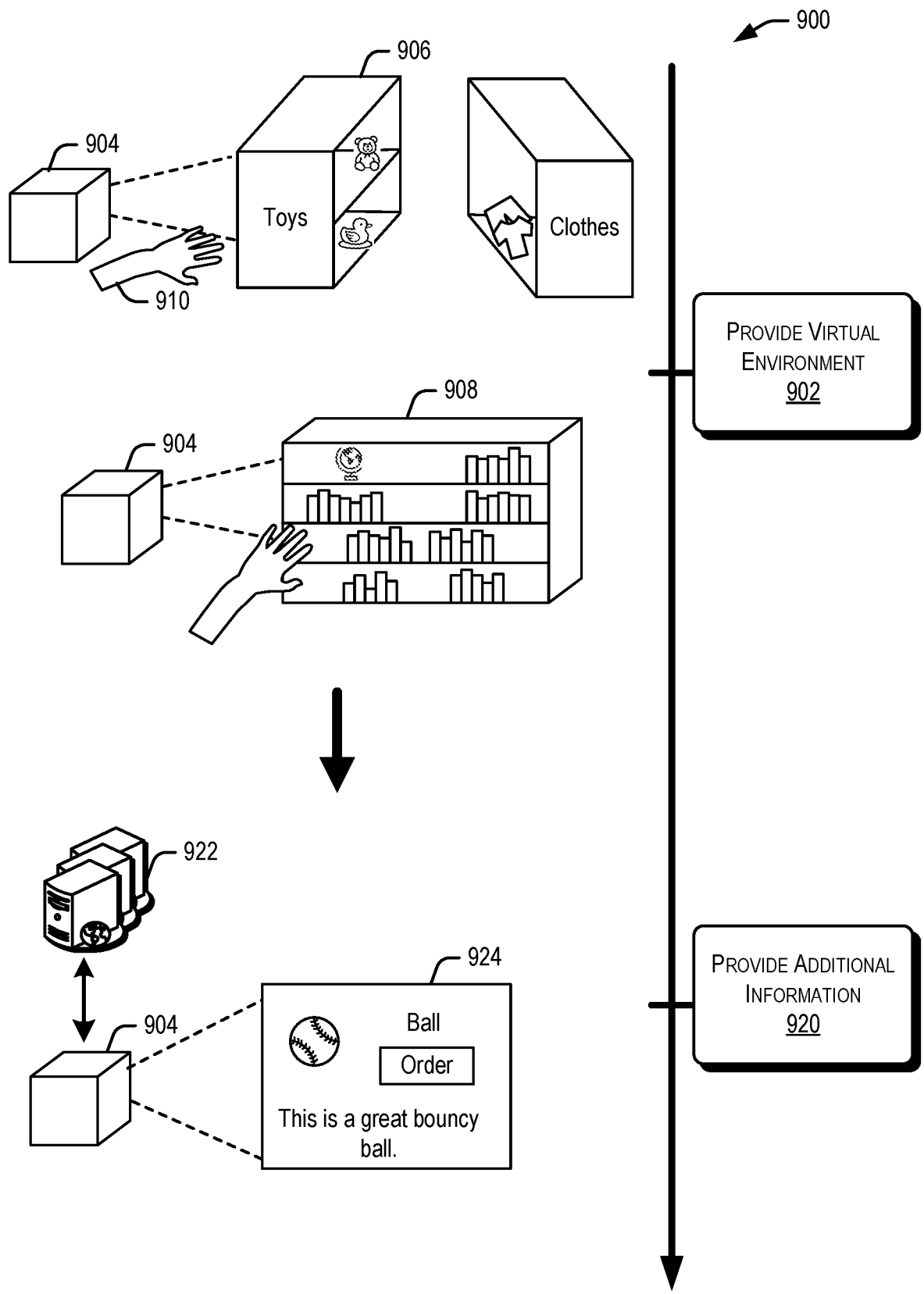
FIG. 9 illustrates an illustrative flow for presenting data described herein, according to at least one example.

FIG. 9 illustrates an illustrative flow for presenting data described herein, according to at least one example. The process 900 may begin with providing a virtual environment at 902. The virtual environment may be presented by a device 904. The virtual environment may comprise a region as illustrated with FIG. 3, including a geographic region of a map. In other examples, the virtual environment may comprise a virtual environment presenting aisles in a store 906, a building, a bookshelf 908, an augmented or virtual reality environment, and the like. In some examples, the virtual environment may overlay over a real-world environment captured by a virtual reality (VR) headset. The user may interact 910 with the virtual environment to receive additional detail about the representations of the items in the virtual environment. This process may be similar to other processes discussed throughout the disclosure and is abbreviated for ease of illustration.

The interaction 910 at the user device 904 may comprise accessing item detail associated with the representations of the items, adding an item to a wish list, flagging an item, ordering an item, and the like. In some examples, the interactions may be aggregated and stored in a data store as interaction data. The computer system 922 and corresponding data store may be similar to the one or more data management computers 210 and the one or more data stores 234 of FIG. 2. The user device 904 may be similar to the user device 204 of FIG. 2.

At 920, the computer system 922 may transmit additional information to the user device 904. The additional information may include item detail 924 that allows the user to order the item from an item provider or add the item to a wish list. The item detail 924 may be provided to the user device 904 and provided, by the user device 904, to a user interface associated with the user device 904, or any other method of presentation discussed throughout the disclosure.

Figure 10:
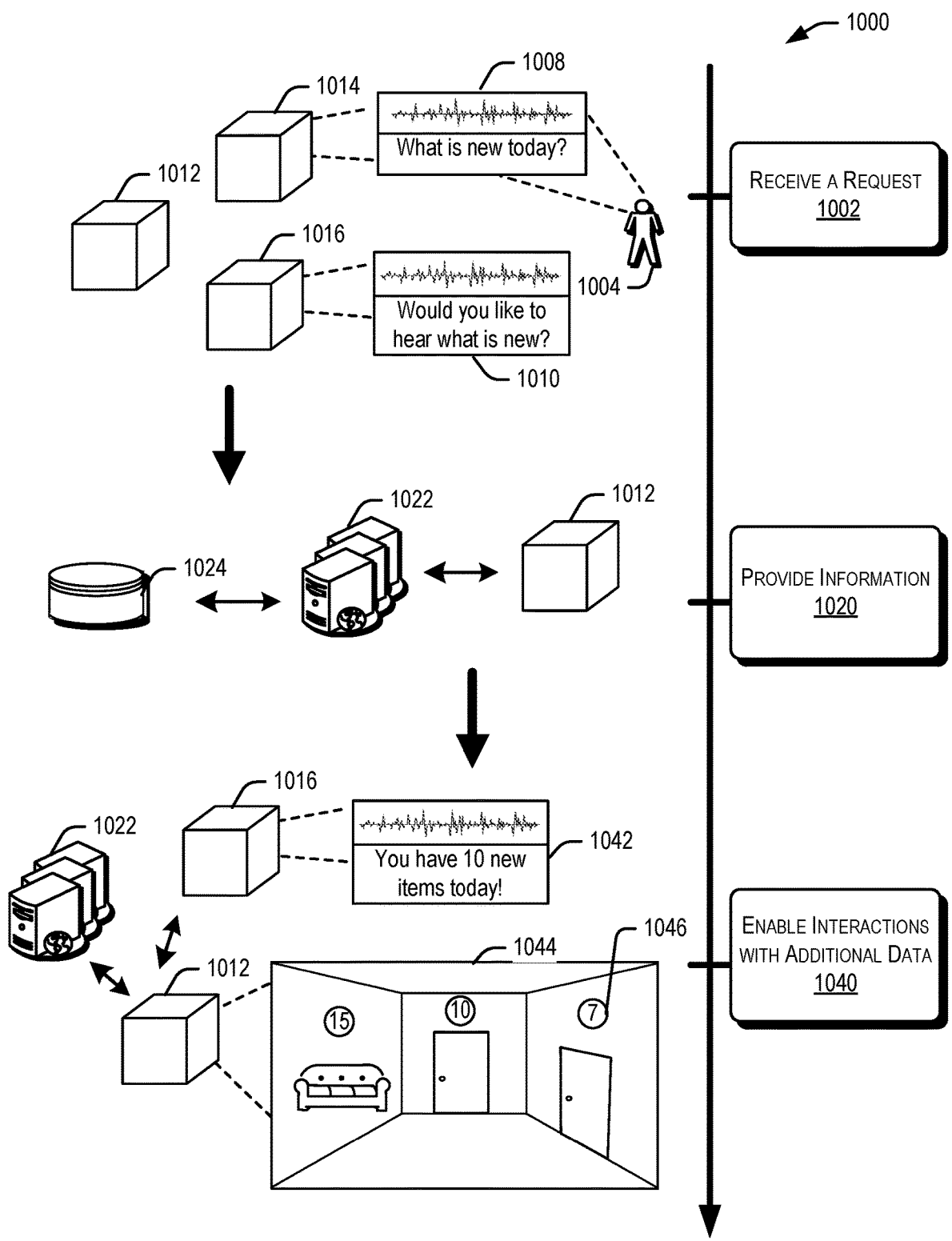
FIG. 10 illustrates an illustrative flow for audibly presenting data based on user interactions described herein, according to at least one example.

FIG. 10 illustrates an illustrative flow for audibly presenting data based on user interactions described herein, according to at least one example. This process may be similar to other processes discussed throughout the disclosure and is abbreviated for ease of illustration. The user device 1012, computer system 1022, and the data store 1024 may be similar to the user devices 204, one or more data management computers 210, and the one or more data stores 234 of FIG. 2.

The process 1000 may begin with receiving a request for information 1002. For example, the request 1008 may be audible from a user 1004 and received by a microphone 1014 associated with a user device 1012. As a sample illustration, the request 1008 may comprise the user 1004 asking "what is new today?" The microphone 1014 may provide the received audio to the user device 1012, which can transmit the received audio to a computer system 1022. In some examples, the request 1010 may be provided by a speaker 1016 associated with the user device 1012. As a sample illustration, the request 1010 may comprise the speaker 1016 providing asking "would you like to hear what is new?" The speaker 1016 may receive the provided audio from the user device 1012 or from a computer system 1022 associated with a data store 1024. In some examples, the user 1004 may respond "yes" or a default response to the question may be received.

Audio analysis may be implemented in various embodiments of the disclosure. For example, the received audio may comprise frequency specifications or data identifiers that may be represented as analog or digital signals, and in the time or frequency domains. A Fourier transform may be applied in the frequency domain of the audio data (e.g., the first data and/or the second data, data from multiple sources, etc.). For example, a fast Fourier transform (FFT) may be implemented. During the analysis, the audio signal may be compared with sinusoids of various frequencies to obtain a magnitude coefficient of each data source. If the coefficient is large in comparison to a coefficient threshold, there may be a high similarity between the signal and the sinusoid and the signal may contain a periodic oscillation at that frequency. When two or more data sources are analyzed, this may determine that the data may be similar. If the coefficient is small in comparison to the coefficient threshold, there may be little to no similarity between the signal and the sinusoid, which can identify that the periodic oscillation is present at a different frequency. When two or more data sources are analyzed, this may determine that the data may not be similar.

At 1020, information may be provided between the computer system 1022 and the user device 1012. For example, the user device 1012 may provide environmental data to the computer system 1022, as discussed throughout the disclosure. In another example, the computer system 1022 may provide representations of items to the user device 1012. The representations may be stored with the data store 1024 and/or associated with the environmental data provided by the user device 1012.

In some examples, the computer system 1022 may provide a plurality of representations to the user device, including representations of items at a first resolution level and a second resolution level, where the second resolution level may be higher than the first resolution level. For example, the representations of items at a first resolution level may include a summary or aggregation of items and the representations of items at a second resolution level may include more detail about the items, including information about individual items or more detailed summaries of items than the first resolution level. The plurality of representations may be stored with data store 1024 (e.g., recorded by a user, generated by a computer system 1022 using a text-to-audio algorithm known in the art, etc.).

At 1040, interactions with the data may be enabled. For example, the computer system 1022 can provide the additional information at the first and second resolution levels to the user device 1012, which presents the additional information 1042 via the speaker 1016. As a sample illustration, the additional information 1042 may comprise "you have ten new items today!"

In some examples, the user device 1012 may provide a plurality of representations to a user interface 1044, as discussed throughout the disclosure. The user interface 1044 may provide the representations of the items at a first resolution level 1046 that summarizes the items associated with the environmental data. For example, the environmental data corresponding to the summarized representations of items at the first resolution level 1046 may comprise a first room of a building may correspond with fifteen items, the second room of the building may correspond with ten items, and the third room of the building may correspond with seven items. The user may interact with the first resolution level 1046 to access a second resolution level and/or item detail, as discussed herein.

In some examples, the user device 1012 move or change its location. In some examples, the environmental data may include location data (e.g., from a positioning system associated with the user device 1012, a user profile, or device profile, etc.). When the user device 1012 is found in one location, the location data or profile may be updated. When the user device 1012 moves, updated representations of items may be provided to correspond with the updated location data. The user device 1012 may present the updated representations for the new location.

Figure 11:
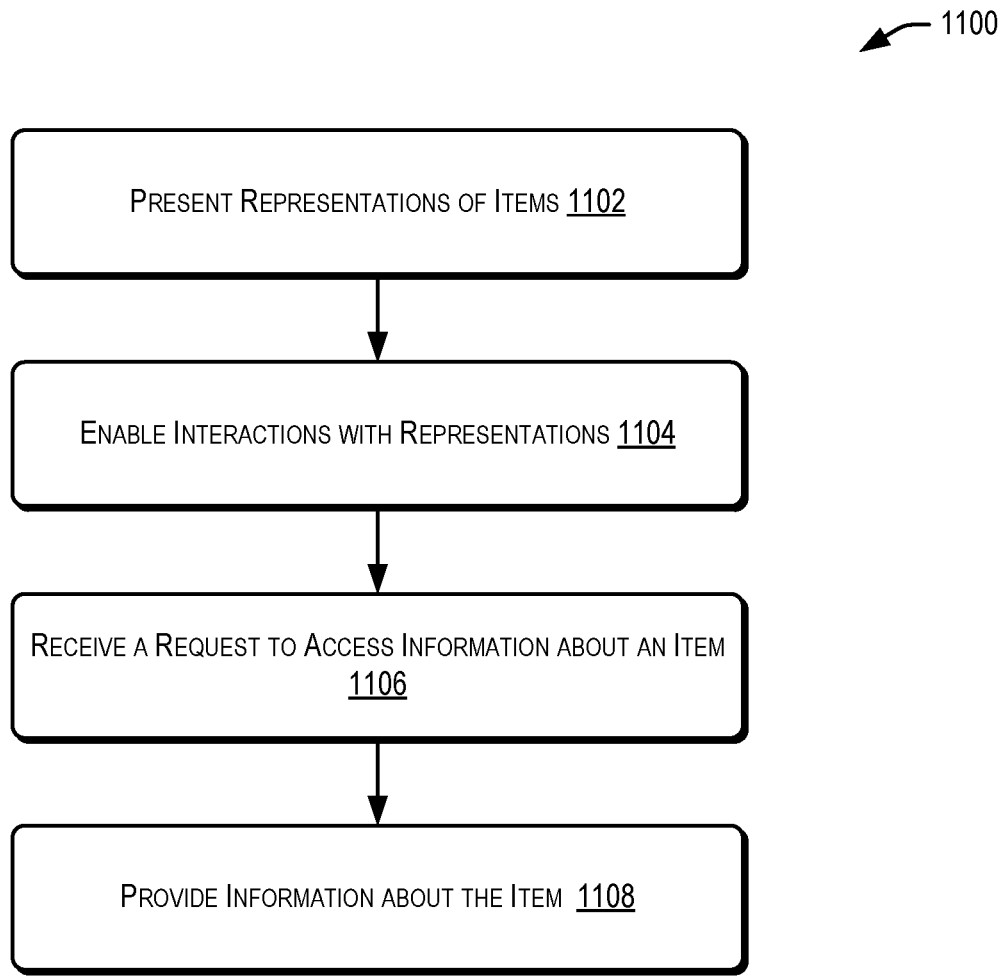
FIG. 11 illustrates an illustrative flow for managing data described herein, according to at least one example.

FIG. 11 illustrates an illustrative flow for managing data described herein, according to at least one example. In some examples, the one or more data management computers 210 (e.g., utilizing at least one of the resolution module 236, the navigation graph module 238, the geography/mapping module 240, the item module 242, and/or the order history module 244) or one or more user devices 204 shown in FIG. 2 may perform the process 1100 of FIG. 11.

Some or all of the process 1100 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The process 1100 may begin at 1102 by presenting a representation of an item. For example, the data management computers 210 may provide an image of a map for presentation at a user interface of the user device. The image of the map may correspond with data overlaying the image of the map. In some examples, the data overlaying the image of the map may comprise visual representations of items that are available from a storage facility. The map may be provided at a first resolution.

Various embodiments are discussed throughout the disclosure for presenting representations of an item, any of which may be implemented herein. For example, the data management computers 210 may present environmental data to present an image of an item within the environmental data, in an augmented reality implementation. In another example, the data management computers 210 may provide an image of the item as an overlay in a virtual environment, which is then presented by a virtual reality device. In another example, the data management computers 210 may provide an audible description of the item that may be audibly presented by the user device 204. In each instance, the item may be presented at a first resolution (e.g., with less detail than presenting the image at a higher resolution, etc.).

At 1104, the data management computers 210 may enable interactions with the representations of items. For example, the interactions may include changing the resolution of the image to show a detailed region of the image. The interactions may also comprise panning or requesting additional details about the item. Other interactions are available.

At 1106, the data management computers 210 may receive a request to access information about the item. For example, the request may comprise a user requesting to change the resolution of the image of the region. The request may correspond with selecting a zoom tool (e.g., a "+" or "−" button, etc.), scrolling, speaking a command to increase the resolution (e.g., "give me more data" or "yes," etc.), blinking (e.g., in a virtual or augmented reality environment, etc.), tapping, or otherwise requesting to enlarge a portion of the region provided at the user interface.

In response to the first request, the data management computers 210 can provide a more detailed region of the image. The data management computers 210 may also or alternatively provide an overlay of a subset of the representations over the detailed region at a second resolution. The second resolution may be a higher resolution than the first resolution (e.g., to appear as the user interface zoomed into the region, etc.).

The data management computers 210 may receive a second request. The second request, in some examples, may request to access information about an item of the items available from the storage facility. The second request may comprise selecting one or more of the overlay of the subset of the representations. In some examples, the second request may be received in response to panning to a different region.

At 1108, the data management computers 210 may provide information about the item. For example, in response to the second request, the data management computers 210 can provide an item image associated with the item. The item image may be overlaid over the detailed region. In some examples, the item image may have a higher resolution than the second resolution (e.g., to provide more detail, etc.).

In another embodiment of process 1100, the process 1100 may begin at 1102 by providing, to a virtual reality (VR) headset, representations of a plurality of items for presentation at an interface of the VR headset, the plurality of items available from one or more storage facilities. For example, the data management computers 210 may provide a representation of an item to a VR headset to project by the VR headset onto a user interface. In some examples, the representations of the item may be presented to the user interface without projecting, but rather displaying or enabling to display the representations of the item.

At 1104, the data management computers 210 may enable interactions with the representations of items. For example, the data management computers 210 may enable interactions with the representations based on data sensed by the VR headset (e.g., environmental data, profile data, tapping, clicking, blinking, etc.). The interactions can comprise accessing or requesting varying resolution levels associated with presenting the visual representations at the interface of the VR headset.

At 1106, the data management computers 210 may receive a request to access information about the item. For example, the data management computers 210 may receive, from the VR headset, a request to access information about a first item of the plurality of items available from the one or more storage facilities. The request may be received based at least in part on a selection of a representation of the first item via the interface of the VR headset. The representation of the first item may be presented on the interface at one of the resolutions levels.

In response to the first request, the data management computers 210 can provide a more detailed information associated with the representation of the item. This may include providing the representation of the item at a higher resolution level than the initial representation of the item. The data management computers 210 may also or alternatively provide an overlay of a subset of the representations over the interface of the VR headset at a second resolution. The second resolution may be a higher resolution than the first resolution (e.g., to appear as the user interface zoomed into the region, etc.).

The data management computers 210 may receive a second request. The second request, in some examples, may request to access information about an item of the items available from the storage facility. The second request may comprise selecting one or more of the representations.

At 1108, the data management computers 210 may provide information about the item. For example, in response to the second request or based at least in part on the request, the data management computers 210 can provide an item image or item detail to the VR headset for presentation at the interface of the VR headset.

Figure 12:
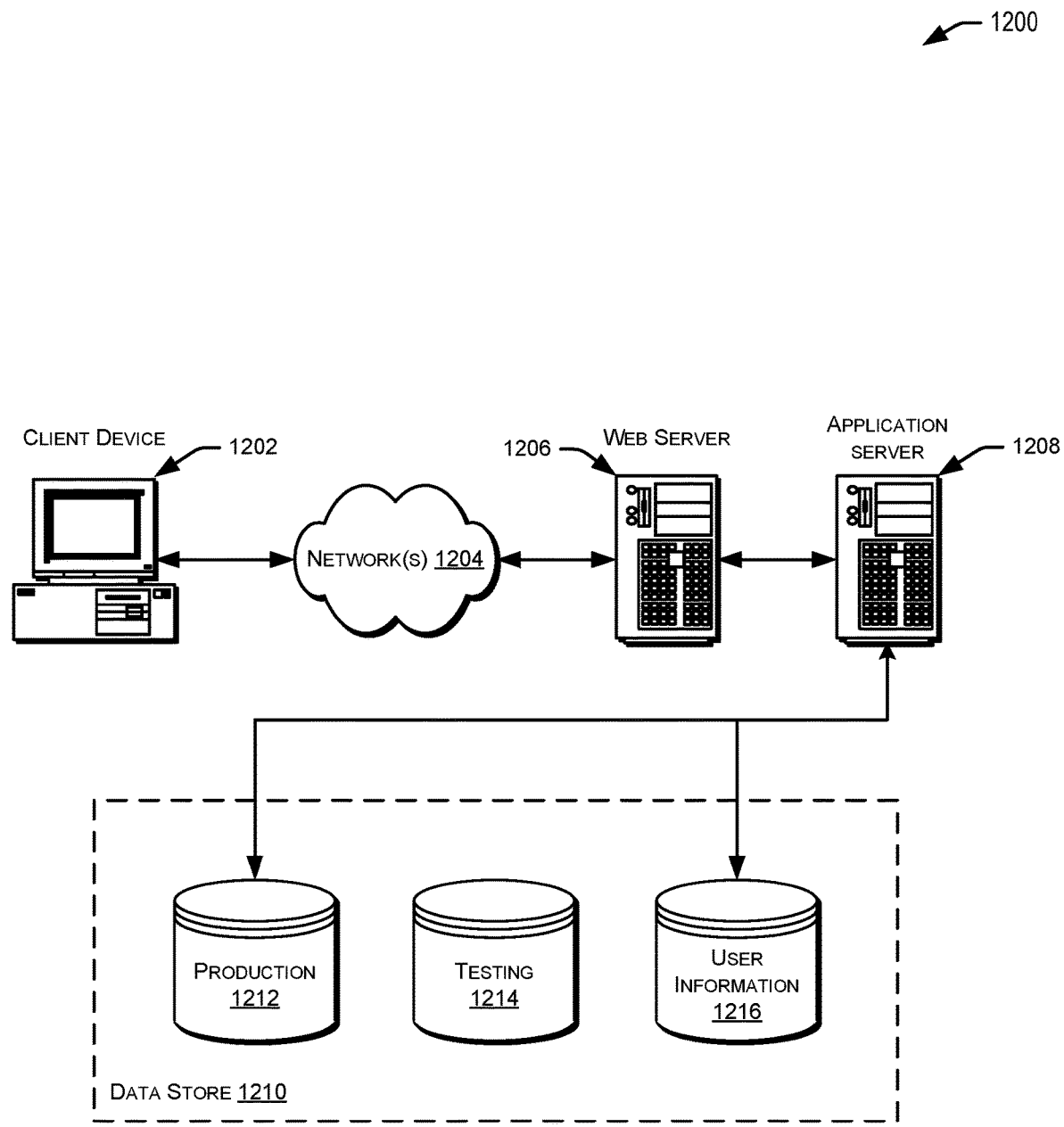
FIG. 12 illustrates an environment in which various embodiments can be implemented.

FIG. 12 illustrates aspects of an example environment 1200 for implementing aspects in accordance with various embodiments. As will be appreciated, although a Web-based environment is used for purposes of explanation, different environments may be used, as appropriate, to implement various embodiments. The environment includes an electronic client device 1202, which can include any appropriate device operable to send and receive requests, messages, or information over an appropriate network 1204 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1206 for receiving requests and serving content in response thereto, although for other networks an alternative device serving a similar purpose could be used as would be apparent to one of ordinary skill in the art.

The illustrative environment includes at least one application server 1208 and a data store 1210. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1202 and the application server 1208, can be handled by the Web server. It should be understood that the Web and application servers are not required and are merely example components, as structured code discussed herein can be executed on any appropriate device or host machine as discussed elsewhere herein.

The data store 1210 can include several separate data tables, databases or other data storage mechanisms and media for storing data relating to a particular aspect. For example, the data store illustrated includes mechanisms for storing production data 1212 and user information 1216, which can be used to serve content for the production side. The data store also is shown to include a mechanism for storing log data 1214, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1210. The data store 1210 is operable, through logic associated therewith, to receive instructions from the application server 1208 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1202. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk®. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C #, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   providing, by a computer system to a user device over a data network, an image of a map for presentation at a user interface of the user device, the image overlaying visual representations over a geographic region of the map at a first resolution, the visual representations representing items available from a storage facility;
   enabling, by the computer system, interaction with the image of the map at the user interface, including the interaction of zooming into the image of the map to show a detailed geographic region of the image of the map;
   receiving, by the computer system from the user device over the data network, a first request to zoom into the image of the map;
   in response to the first request, providing, by the computer system to the user device over the data network, the detailed geographic region of the image of the map and an overlay of a subset of the visual representations over the detailed geographic region at a second resolution, the second resolution being higher than the first resolution;
   receiving, by the computer system from the user device over the data network, a second request to access information about an item of the items available from the storage facility;
   in response to the second request, providing, by the computer system to the user device over the data network, an item image associated with the item, the item image being overlaid over the detailed geographic region and having a higher resolution than the second resolution;
   determining, by the computer system, a number of interactions with the item; and
   providing, by the computer system to the user device over the data network, a reorganization of a first representation of the item in the detailed geographic region of the image of the map based at least in part on a comparison of the number of interactions with the item and a threshold.

2. The computer-implemented method of claim 1, further comprising:
   associating the item image with an active link;
   receiving an activation of the active link; and
   providing an item detail page of the first item accessible by the active link.

3. The computer-implemented method of claim 1, further comprising:
   categorizing the items available from the storage facility, such that the item corresponds with a first category of the map and a second item corresponds with a second category of the map;
   correlating the first category with the detailed geographic region; and
   correlating the second category with a different geographic region of the map.

4. The computer-implemented method of claim 1, further comprising:
   comparing features of the item with features of a second item;
   determining similarities between the first item and the second item based at least in part on the comparing; and
   adjusting the image of the map to overlay the first visual representation representing the item and a second visual representation representing the second item within a proximate distance based at least in part on the similarities.

5. The computer-implemented method of claim 1, wherein the interactions with the visual representations allow three-dimensional navigation, and the overlay of the subset of the visual representations over the detailed geographic region is based at least in part on the three-dimensional navigation.

6. One or more computer-readable storage media collectively storing computer-executable instructions that, when executed by one or more computer systems, configure the one or more computer systems to collectively perform operations comprising:
   providing representations of a plurality of items to a user device for presentation at an interface of the user device, the plurality of items available from one or more storage facilities;
   enabling interactions with the representations via the interface of the user device, the interactions comprising varying resolution levels associated with presenting the visual representations at a network document;
   receiving, from the user device, a request to access information about a first item of the plurality of items available from the one or more storage facilities, the request received based at least in part on a selection of a representation of the first item;
   based at least in part on the request, providing, to the user device, a second information describing the first item;
   determining a number of interactions with the first item; and
   providing, to the user device, a reorganization of the representation of the first item in the network document based at least in part on a comparison of the number of interactions with the first item and a threshold.

7. The one or more computer-readable storage media of claim 6, further comprising instructions that are executable by the one or more computer systems to:
   prior to receiving the request, receiving a first request to zoom into the network document; and
   in response to the first request, providing a detailed geographic region of an image of a map at a second resolution level, the second resolution level being higher than a first resolution level.

8. The one or more computer-readable storage media of claim 6, further comprising instructions that are executable by the one or more computer systems to:
   instructing the user device to present the subset of the representations at the second resolution level based at least in part on receiving an indication from the script about an interaction at the second resolution level.

9. The one or more computer-readable storage media of claim 6, further comprising instructions that are executable by the one or more computer systems to:
   generating an image tile of the first item;

receiving an update associated with the first item; and
replacing the image tile with a new image tile, based at least in part on the update.

10. The one or more computer-readable storage media of claim 6, further comprising instructions that are executable by the one or more computer systems to: providing a plurality of representations for a single item to the user device, wherein the plurality of representations correspond with different resolutions of the single item.

11. The one or more computer-readable storage media of claim 6, further comprising instructions that are executable by the one or more computer systems to:
providing a low resolution image to the user device;
receiving a second request from the user device; and
based at least in part on receiving the second request, providing a high resolution image to the user device, wherein the low resolution image and the high resolution image correspond with a same item and the user device is enabled to access the high resolution image in response to the second request.

12. A computing device comprising:
a memory configured to store computer-executable instructions; and
a processor in communication with the memory configured to execute the computer-executable instructions to at least:
present, by the computing device, representations of a plurality of items, the plurality of items available from one or more storage facilities;
enable interactions with the representations, the interactions comprising changing resolutions of the representations, a first resolution level corresponding to a presentation of the representations, and a second resolution level corresponding to a presentation of a subset of the representations;
receive a request to access information about a first item of the plurality of items available from the one or more storage facilities the request received based at least in part on a selection of a first representation of the first item presented at the second resolution level; and
based at least in part on the request, present a second representation of the first item, the second representation being at a higher resolution than the first representation, wherein:
the computing device comprises an audio input and an audio output, the interactions are audio commands,
the representations are audio presentations of information,
the first resolution level is a summary of the plurality of items available from the one or more storage facilities,
the second resolution level comprises more detail than the first resolution level, and
the summary is associated with a profile of a user operating the computing device or with the computing device.

13. The computing device of claim 12, wherein the processor is further configured to at least:
provide a first geographic region of a map at the first resolution level to a network document; and
provide a second geographic region of a map at the second resolution level to the network document.

14. The computing device of claim 13, wherein the subset of representations at the second resolution level correspond with a context of use of the representations with the second geographic region of the map at the second resolution level, and the representations are visual representations.

15. The computing device of claim 12, wherein the processor is further configured to at least:
receive order history for the first item, wherein the order history corresponds with a user operating a user device to access a network document; and
reorganize the network document to place items similar to the first item in a center of the network document.

16. The computing device of claim 12, wherein the processor is further configured to at least:
determine a category for the first item;
determine additional items associated with the category; and
provide additional representations of the additional items at a network document based at least in part on the category.

17. The computing device of claim 12, wherein the processor is further configured to at least:
receive an identification of an interaction with the first item; and
activate a flag at a network document associated with the first item.

18. The computing device of claim 17, wherein the processor is further configured to at least: after receive the identification of the interaction, adding the first item to a wish list.

19. The computing device of claim 12, wherein the processor is further configured to at least:
compare a first representation of the first item with a second representation of a second item;
determine that the first item and the second item are similar items based on the comparison; and
reorganize a network document to group the similar items within a proximate distance.

* * * * *

UNITED STATES PATENT AND TRADEMARK OFFICE
CERTIFICATE OF CORRECTION

PATENT NO.         : 10,606,449 B2
APPLICATION NO.    : 15/474939
DATED              : March 31, 2020
INVENTOR(S)        : Darren Ernest Canavor et al.

Page 1 of 1

It is certified that error appears in the above-identified patent and that said Letters Patent is hereby corrected as shown below:

Column 34, Line 39, Claim 18:
Delete: "processor is further configured to at least: after receive the"
Insert: --processor is further configured to at least: after receiving the--

Signed and Sealed this
Twenty-third Day of June, 2020

Andrei Iancu
*Director of the United States Patent and Trademark Office*